(12) United States Patent
Hedges et al.

(10) Patent No.: US 9,904,725 B1
(45) Date of Patent: Feb. 27, 2018

(54) COMPUTER SYSTEM FOR GENERATION, STORAGE, AND ANALYSIS OF CONNECTION DATA AND UTILIZATION OF CONNECTION DATA IN SCORING AND DISTRIBUTION SYSTEMS

(71) Applicant: Velocify, Inc., El Segundo, CA (US)

(72) Inventors: Nicholas Hedges, Santa Monica, CA (US); David Moynan, Redondo Beach, CA (US)

(73) Assignee: Velocify, Inc., El Segundo, CA (US)

( * ) Notice: Subject to any disclaimer, the term of this patent is extended or adjusted under 35 U.S.C. 154(b) by 333 days.

(21) Appl. No.: 14/823,947

(22) Filed: Aug. 11, 2015

Related U.S. Application Data

(60) Provisional application No. 62/097,435, filed on Dec. 29, 2014.

(51) Int. Cl.
*G06F 7/00* (2006.01)
*G06F 17/30* (2006.01)

(52) U.S. Cl.
CPC .. *G06F 17/30604* (2013.01); *G06F 17/30029* (2013.01); *G06F 17/30345* (2013.01); *G06F 17/30876* (2013.01)

(58) Field of Classification Search
CPC .................................................. G06F 17/30029
See application file for complete search history.

(56) References Cited

U.S. PATENT DOCUMENTS

| | | | |
|---|---|---|---|
| 5,095,505 A | 3/1992 | Finucane et al. | |
| 5,274,699 A | 12/1993 | Ranz | |
| 5,282,243 A | 1/1994 | Dabbaghi et al. | |
| 5,283,824 A | 2/1994 | Shaw | |
| 5,590,184 A | 12/1996 | London | |
| 5,592,543 A | 1/1997 | Smith et al. | |
| 5,740,538 A | 4/1998 | Joyce et al. | |
| 5,784,444 A | 7/1998 | Snyder et al. | |
| 5,864,612 A | 1/1999 | Strauss et al. | |
| 5,901,209 A | 5/1999 | Tannenbaum et al. | |

(Continued)

FOREIGN PATENT DOCUMENTS

| | | |
|---|---|---|
| AU | 2011201515 | 10/2012 |
| KR | 20120105157 | 9/2012 |

(Continued)

OTHER PUBLICATIONS

Torrone, Phillip, Questions about the Caller ID falsification service answered, www.engadget.com (Aug. 31, 2004).

(Continued)

*Primary Examiner* — Ajith Jacob
(74) *Attorney, Agent, or Firm* — SoCal IP Law Group LLP; Steven C. Sereboff

(57) ABSTRACT

The present disclosure describes systems and methods for generating a set of connection data indicating the connections between entities received by a profile management system. Connections may be automatically generated to indicate duplicate, referral, or company connections between one or more entities. Furthermore, the connection data may be used to predict the likelihood of particular outcomes in response to contacting an entity associate with a particular profile, distribution of profiles to appropriate entities, and prioritization of profiles for an entity.

10 Claims, 17 Drawing Sheets

(56) References Cited

U.S. PATENT DOCUMENTS

| | | | |
|---|---|---|---|
| 5,926,539 A | 7/1999 | Shtivelman | |
| 5,966,695 A | 10/1999 | Melchione et al. | |
| 6,130,935 A | 10/2000 | Shaffer et al. | |
| 6,137,870 A | 10/2000 | Scherer | |
| 6,157,655 A | 12/2000 | Shtivelman | |
| 6,310,943 B1 | 10/2001 | Kowalski | |
| 6,310,948 B1 | 10/2001 | Nemeth | |
| 6,343,120 B1 | 1/2002 | Rhodes | |
| 6,373,836 B1 | 4/2002 | Deryugin et al. | |
| 6,411,692 B1 | 6/2002 | Scherer | |
| 6,426,950 B1 | 7/2002 | Mistry | |
| 6,442,242 B1 | 8/2002 | McAllister et al. | |
| 6,449,351 B1 | 9/2002 | Moss et al. | |
| 6,625,139 B2 | 9/2003 | Miloslaysky et al. | |
| 6,633,633 B1 | 10/2003 | Bedingfield | |
| 6,643,363 B1 | 11/2003 | Miura | |
| 6,661,882 B1 | 12/2003 | Muir et al. | |
| 6,662,006 B2 | 12/2003 | Glass | |
| 6,665,396 B1 | 12/2003 | Khouri et al. | |
| 6,684,336 B1 | 1/2004 | Banks et al. | |
| 6,690,785 B1 | 2/2004 | Stelter et al. | |
| 6,697,858 B1 | 2/2004 | Ezerzer et al. | |
| 6,704,404 B1 | 3/2004 | Burnett | |
| 6,798,772 B2 | 9/2004 | Bergman et al. | |
| 6,831,966 B1 | 12/2004 | Tegan et al. | |
| 6,831,974 B1 | 12/2004 | Watson et al. | |
| 6,853,717 B1 | 2/2005 | Frentz et al. | |
| 6,876,736 B2 | 4/2005 | Lamy et al. | |
| 6,879,683 B1 | 4/2005 | Fain et al. | |
| 6,914,964 B1 | 7/2005 | Levine | |
| 6,941,159 B2 | 9/2005 | Tsai et al. | |
| 6,968,044 B2 | 11/2005 | Beason et al. | |
| 6,999,575 B1 | 2/2006 | Sheinbein | |
| 7,020,256 B2 | 3/2006 | Jain et al. | |
| 7,023,980 B2 | 4/2006 | Lenard | |
| 7,035,699 B1 | 4/2006 | Anderson et al. | |
| 7,065,185 B1 | 6/2006 | Koch | |
| 7,099,445 B2 | 8/2006 | Creamer et al. | |
| 7,103,172 B2 | 9/2006 | Brown et al. | |
| 7,158,630 B2 | 1/2007 | Fotta et al. | |
| 7,170,983 B2 | 1/2007 | Gruchala et al. | |
| 7,170,984 B2 | 1/2007 | Gosselin | |
| 7,184,540 B2 | 2/2007 | Dezonno et al. | |
| 7,280,646 B2 | 10/2007 | Urban et al. | |
| 7,298,833 B2 | 11/2007 | Klein et al. | |
| 7,330,464 B2 | 2/2008 | Brouwer et al. | |
| 7,349,843 B1 | 3/2008 | Beck | |
| 7,398,218 B1 * | 7/2008 | Bernaski | G06Q 40/08 705/3 |
| 7,453,990 B2 | 11/2008 | Welenson et al. | |
| 7,640,009 B2 | 12/2009 | Belkin et al. | |
| 7,720,720 B1 * | 5/2010 | Sharma | G06Q 30/02 705/26.7 |
| 7,734,019 B1 | 6/2010 | Terpstra | |
| 7,756,253 B2 | 7/2010 | Breen et al. | |
| 7,899,169 B2 | 3/2011 | Siminoff | |
| 7,899,619 B2 | 3/2011 | Petras | |
| 7,925,003 B2 | 4/2011 | Haug, Jr. et al. | |
| 7,962,644 B1 | 6/2011 | Ezerzer et al. | |
| 8,027,332 B1 | 9/2011 | Martin et al. | |
| 8,078,605 B2 | 12/2011 | Telschow et al. | |
| 8,135,122 B1 | 3/2012 | Siminoff | |
| 8,150,728 B1 | 4/2012 | Bayer et al. | |
| 8,254,550 B1 | 8/2012 | Serrano | |
| 8,280,022 B1 | 10/2012 | Trinidad et al. | |
| 8,352,388 B2 | 1/2013 | Estes | |
| 8,352,389 B1 | 1/2013 | Martinez et al. | |
| 8,358,758 B2 | 1/2013 | Serrano et al. | |
| 8,565,399 B2 | 10/2013 | Siminoff | |
| 9,154,614 B1 | 10/2015 | Trinidad et al. | |
| 2002/0018547 A1 | 2/2002 | Takae et al. | |
| 2002/0044638 A1 | 4/2002 | Gruchala et al. | |
| 2002/0052820 A1 | 5/2002 | Gatto | |
| 2002/0080942 A1 | 6/2002 | Clapper | |
| 2002/0120461 A1 | 8/2002 | Kirkconnell-Ewing et al. | |
| 2002/0145624 A1 | 10/2002 | Szlam et al. | |
| 2002/0146111 A1 | 10/2002 | Hayashi | |
| 2003/0147519 A1 | 8/2003 | Jain et al. | |
| 2003/0174825 A1 | 9/2003 | Aldridge et al. | |
| 2003/0182175 A1 | 9/2003 | Buie et al. | |
| 2004/0017899 A1 | 1/2004 | Garfinkel et al. | |
| 2004/0063432 A1 | 4/2004 | Borsan | |
| 2004/0064360 A1 | 4/2004 | Meggs | |
| 2004/0101123 A1 | 5/2004 | Garcia | |
| 2004/0143473 A1 | 7/2004 | Tivey et al. | |
| 2004/0143482 A1 | 7/2004 | Tivey et al. | |
| 2004/0266415 A1 | 12/2004 | Belkin et al. | |
| 2005/0044036 A1 | 2/2005 | Harrington et al. | |
| 2005/0053213 A1 | 3/2005 | Giannoit | |
| 2005/0141479 A1 | 6/2005 | Ozugur et al. | |
| 2006/0140200 A1 | 6/2006 | Black et al. | |
| 2007/0064895 A1 | 3/2007 | Wong et al. | |
| 2007/0127703 A1 | 6/2007 | Siminoff | |
| 2007/0239514 A1 | 10/2007 | Lissy et al. | |
| 2007/0239721 A1 | 10/2007 | Ullman et al. | |
| 2007/0263819 A1 | 11/2007 | Finkelman et al. | |
| 2007/0263853 A1 | 11/2007 | Pearson et al. | |
| 2008/0063153 A1 | 3/2008 | Krivorot et al. | |
| 2008/0089501 A1 | 4/2008 | Benco et al. | |
| 2008/0208651 A1 | 8/2008 | Johnston et al. | |
| 2008/0300961 A1 | 12/2008 | Cawston et al. | |
| 2009/0003566 A1 | 1/2009 | Wentink | |
| 2009/0094235 A1 | 4/2009 | White et al. | |
| 2009/0100139 A1 | 4/2009 | Purdy et al. | |
| 2009/0154686 A1 | 6/2009 | Purdy et al. | |
| 2009/0192880 A1 | 7/2009 | Hood et al. | |
| 2010/0088319 A1 | 4/2010 | Van Natter et al. | |
| 2011/0060643 A1 | 3/2011 | Davis et al. | |
| 2011/0264479 A1 | 10/2011 | Birr | |
| 2011/0288962 A1 | 11/2011 | Rankin et al. | |
| 2012/0189111 A1 | 7/2012 | Siminoff | |
| 2012/0203584 A1 | 8/2012 | Mishor et al. | |
| 2014/0029738 A1 | 1/2014 | Siminoff | |
| 2014/0067465 A1 | 3/2014 | Tivey et al. | |
| 2014/0089026 A1 | 3/2014 | Birr | |
| 2014/0114997 A1 | 4/2014 | Purdy | |
| 2014/0149161 A1 | 5/2014 | Hedges | |
| 2014/0149178 A1 | 5/2014 | Hedges | |

FOREIGN PATENT DOCUMENTS

| | | |
|---|---|---|
| WO | WO 1999/28821 | 6/1999 |
| WO | WO 2012/075101 | 6/2012 |

OTHER PUBLICATIONS

Marketo Lead Management Foundation Training Coursebook, dated Feb. 2012, pp. 1-76.

White Paper, "A Comprehensive Guide to Managing Lead Quality with Data and Scoring," eBureau, pp. 1-10.

* cited by examiner

COMPUTER SYSTEM FOR GENERATION, STORAGE, AND ANALYSIS OF CONNECTION DATA AND UTILIZATION OF CONNECTION DATA IN SCORING AND DISTRIBUTION SYSTEMS

CROSS-REFERENCE TO RELATED APPLICATIONS

This application claims priority from provisional U.S. Pat. App. No. 62/097,435 filed on Dec. 29, 2014, which is hereby incorporated by reference in its entirety.

BACKGROUND

Previous systems inefficiently access and store connection data in computer systems. This results in large computer resource requirements and utilization during analysis and distribution of connection data. In response, many systems do not track connection data, or do not track connection data early in the processing of a profile, which reduces the overall value of the connection data.

SUMMARY

The embodiments described herein provide distinct improvements to computer technology, namely to the efficiency of processing and storage of connection data in a profile management system. For example, systems may allow efficient maintenance of relationship and connection data without dependence on significant amounts of individual data storage for each individual entity. For example, the system may store a connection as a tag in a database with associated data indicating information about the connection. Individual entities may then be associated with the tag minimizing the utilization of system processing and memory resources when accessing, analyzing, and updating profile connection information. In some embodiments, the system allows for real-time automatic identification and generation of connection data indicating specific connections between entities or previous contact with a single entity. The connection data may be stored as a tag in a data field associated with a lead to identify other leads sharing the connection.

Some embodiments may comprise a profile management system with one or more hardware computer processors and one or more storage devices. The storage devices may be configured to store software instructions configured for execution by the one or more hardware computer processors in order to cause the computer processors to perform a number of operations. These operations may include determining one or more attributes of a first profile. The processors may then generate a profile score for the first profile based at least in part on the one or more attributes of the profile. The profile score may be generated based on a scoring model configured to correlate the attributes of a profile with a likelihood that contacting an entity associated with the first profile will result in a positive outcome. The processors may also identify a connection between the first profile and a second profile based at least in part on the attributes of the first profile and then generate connection data indicating a relationship between the first profile and the second profile. The processors may also associate the connection data with the first profile and the second profile. The profile score may be updated based on the connection data based on a perceived difference in likelihood of a positive outcome. The computer processors may also assign the first profile to an agent based on at least one of: the one or more attributes of the first profile, the profile score for the first profile, and the connection data associated with the first profile. The computer processors may also distribute the first profile, the connection data associated with the first profile, and the second profile to the assigned agent. The first profile may be prioritized among a set of profiles assigned to the agent based on the connection data associated with the first profile. In some embodiments, the first profile may be assigned to the agent based on a determination that the second profile is assigned to the agent.

In some embodiments the identified connection between the first profile and the second profile indicates that the first profile and second profile are duplicates. In some embodiments, the first profile is identified as a high value profile based on a determination that the first profile and the second profile are duplicates associated with an entity that initiated contact attempts within a threshold period of time. In some embodiments, the first profile is prioritized ahead of other profiles in the set of profiles assigned to the agent based on a determination that the profile is a high value profile.

In some embodiments, the first profile is identified as a multiple contact profile based on a determination that the first profile and the second profile are duplicates and an entity associated with the profiles initiated a first contact attempt at least a threshold amount of time after the second contact attempt. The first profile may be prioritized ahead of other profiles in the set of profiles assigned to an agent based on a determination that the profile is a multiple contact profile.

In some embodiments, the identified connection comprises an indication that a first entity associated with the first profile was a referral from a second entity associated with the second profile. The profile score may be increased based on the determination that the first user is a referral from the second user.

In some embodiments, the identified connection between the first profile and the second profile comprises an indication that users associated with the first and second profiles are associated with the same company.

BRIEF DESCRIPTION OF THE DRAWINGS

FIGS. 3-7 show examples of user interfaces that may be implemented as a part of a lead connection system, as used in an embodiment.

FIGS. 12-14 show examples of user interfaces that may be implemented as a part of a lead connection system, as used in an embodiment.

DETAILED DESCRIPTION

Figure 1:
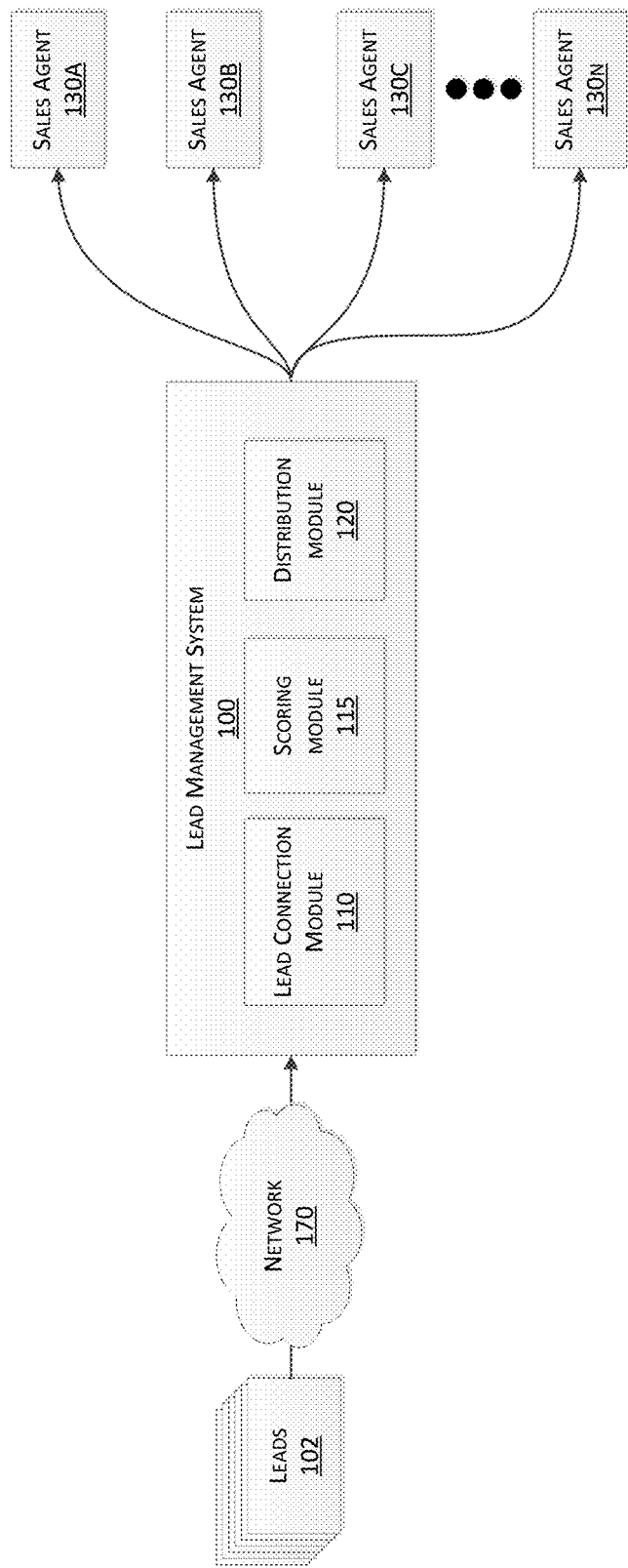
FIG. 1 is a block diagram illustrating a high-level overview of a lead connection system, as used in an embodiment.

Duplicate and referral leads often provide a greater chance of conversion than other leads. However, many systems do not track lead referrals, connections, and duplicate leads until after a sale or conversion has been made. This may be because of the amount of data and structure that needs to be maintained and processed to track connections or lack of ability to track leads in lighter systems. In addition, multiple individuals in a sales channel may need to be contacted individually. For example, multiple employees at a company may need to be contacted to make a sale. In another example, when selling mortgage or loan products, the realtor, buyer, co-borrows, and other individuals may need to be contacted multiple times in an intelligent way to make a sale.

Many systems also do not track referrals or do so poorly. However, referrals are often more likely to turn into sales than non-referrals. In addition to providing information to an agent to help with a sale and building trust, tracking referrals may enable better tracking of the total value of a lead based on the value of all referrals as well. This may help prioritization and distribution services increase performance.

Additionally, duplicate leads have value, either providing additional information about a lead or an indication of a lead's likelihood of conversion. Previous de-duplication systems require merging leads into a single lead. However, this process requires discarding some important information. As disclosed herein, instead of merging duplicate leads, the leads may be connected by a tag or storage of other small information that can immediately connect duplicate leads without discarding data. Additionally, leads coming into a lead management system multiple times within a short time period may be flagged as high priority, as the lead has demonstrated they are eager to purchase and quickly. Furthermore, leads coming into a lead management system multiple times over a long time period may be flagged as high priority, as the consumer has demonstrated loyalty to the company/product by consistently reaching out to express interest in purchasing.

The systems and methods disclosed herein manage leads and store connections to leads, such as before converting the lead to an account. This generates a simple system to set up and store relationships while minimizing the amount of information that must be stored. This also enables the system to generate connections and relationships at any point after a lead is in the system as well as setting connections by generating new leads from existing leads based on a referral or business connection. The information stored in the connections may be used as an element of prioritization and distribution systems in a lead management system.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Lead: any set of data that represents an entity that may generate new revenue for an organization, such as a profile associated with a user or other entity which has expressed interest in products or services of the organization. A "lead," as used herein may also refer to an individual (or other entity) identified in the lead, rather than the data associated with the individual. For example, a business may purchase a lead (e.g., a set of data or lead attributes associated with an individual, such as demographic and contact information) for purposes of attempting to sell a product or service to the lead (e.g., the individual identified in the lead data). A lead may be associated with an individual, household, business, and/or other group of individuals that is unknown to the organization, or may be an existing or past customer. Lead attributes may include name, street address, city, state, ZIP, age, gender, credit score, income, household income, expenses, debts, assets, product or service of interest, organizational budget, spending authority level of the individual, purchase decision timeframe, previous purchase history, electronic and telephonic interaction history, or any other attribute which provides information about the lead. Leads may be referred to as profiles, connections, contacts, records, or other names in various systems which track, score, and/or distribute leads.

Lead Scoring: methods for allocating an attribute, such as a lead score, to a lead intended to signify its quality (or many qualities) in comparison to other leads. For example, a lead score could indicate a likelihood that a lead will convert (e.g., purchase a product offered by the organization). A lead may have multiple lead scores that signify different qualities regarding the lead.

Lead Distribution: methods for allocating leads to an entity (e.g., an individual sales agent or group of sales agents) within an organization versus other entities in the organization. The entity could be an individual (typically but not necessarily a sales representative or agent) or a group (such as a sales team comprising multiple sales agents).

Lead Prioritization: methods for ranking or otherwise ordering leads which are allocated to an entity, such as an individual sales agent or group of sales agents. For example, leads may be prioritized within a list of leads allocated to an individual sales agent based on the lead scores associated with the leads. In addition to lead scores, the leads may be prioritized based on specific data or attributes associated with the leads.

Overview:

FIG. 1 illustrates an overview of a lead management system 100 as implemented in an embodiment. Leads 102 enter the system through network 170 from a lead source. In some embodiments the lead source may be a webpage or other system that enables a user interested in a product or service to enter personal information requesting additional information about a product or service. The leads 102 may also be accessed from a lead database in some embodiments. In the example of FIG. 1, the lead system 100 includes a lead connection module 110, a scoring module 115, and a distribution module 120. The lead connection module 110 identifies, sets, and manages connections between leads. The scoring module 115 scores leads based on data known about the lead. For example, the lead may be scored based on information about the individual, the product or service the lead is interested in, connections of the lead to other leads, and/or the like. Distribution module 120 determines a distribution of leads to sales agents 130A-130N. In some embodiments the distribution of leads to agents may take into account lead connections. For example, if a new lead is generated as a referral from another lead, the new lead may be distributed to the same agent as the originating lead.

Figure 2:
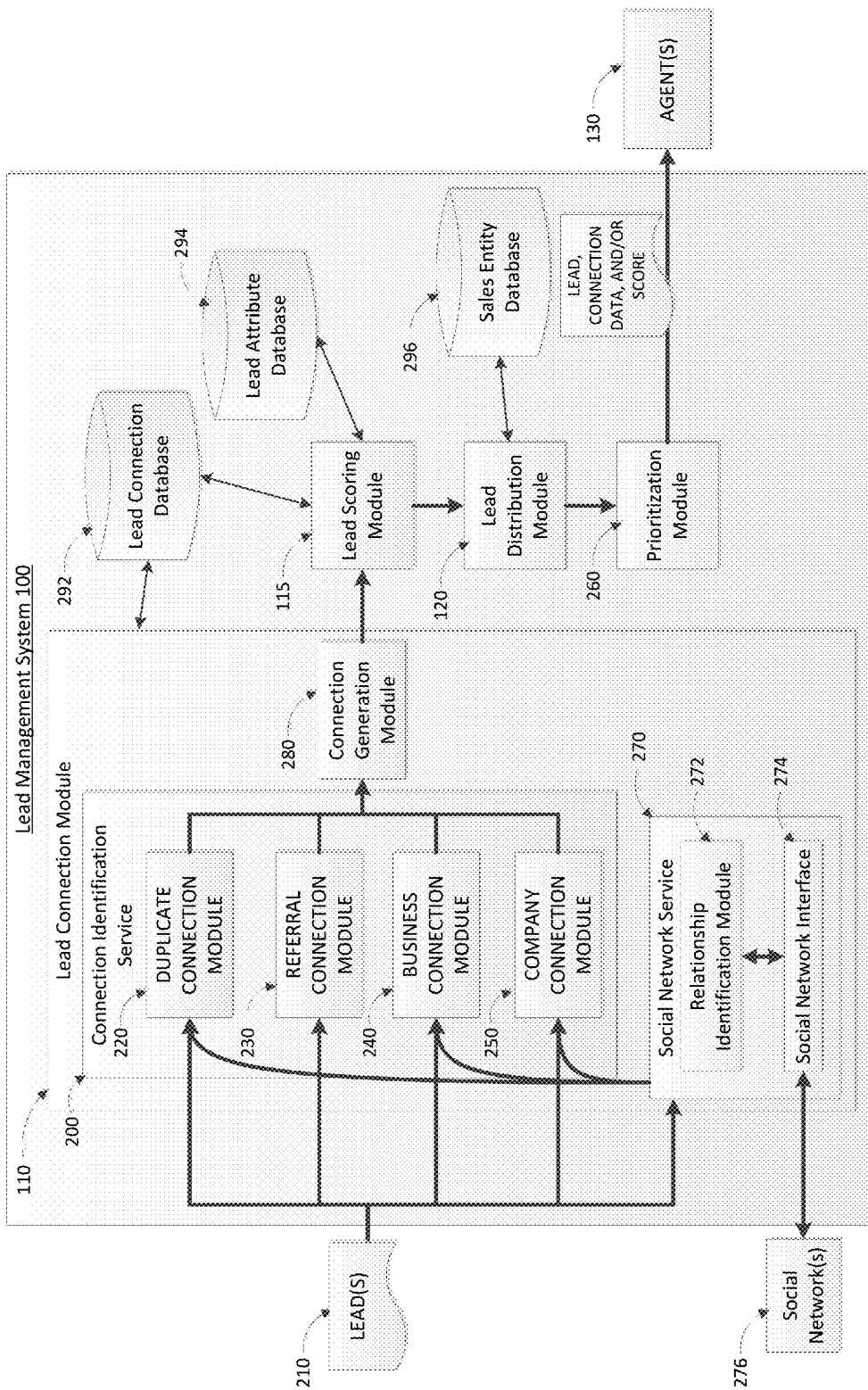
FIG. 2 is a schematic block diagram illustrating an embodiment of a lead management system showing processing of a lead with a lead connection system, as used in an embodiment.

FIG. 2 illustrates a schematic block diagram of an embodiment of a lead management system 100 showing lead processing through the system, for example the system described with reference to FIG. 1. The lead management system may include a lead connection module 110, a lead scoring module 115, a lead distribution module 120, and a lead prioritization module 260, as well as one or more databases. For example, the lead management system 100 may include a lead connection database 292 which stores lead connections, a lead attribute database 294 which stores lead attributes, and a sales entity database 296 which stores information about one or more sales entities such as agent(s) 130. In some embodiments, lead connection data may be stored as lead attributes in the lead attribute database 294 instead of in a lead connection database 292. Processing of leads may begin by receiving one or more leads 210. The leads may be received directly through a lead source as they are generated or may be sent as a batch of new leads from a source. The leads may then be processed by the lead connection module 110.

In some embodiments, the lead connection module 110 may include a connection identification service 200, a social network service 270 and a connection generation module 280. The connection identification service 200 may include modules configured to identify connections associated with the lead, such as modules 220, 230, 240, 250 illustrated in FIG. 2. In this example, the duplication connection module 220 determines if any of the leads are duplicates of other leads received previously and stored in the lead management system 100 and/or in a set of leads being received. The duplication connection module 220 may also determine if a lead should be flagged as special based on the repeat contacts. Example processes used by the duplication module are discussed further below with respect to FIG. 16.

Referral connection module 230 determines if any of the leads are a referral. In some embodiments a lead may be set as a referral if it was generated from another lead. A user accessing the system such as an agent or administrator may be able to define referral connections as discussed in reference to FIGS. 4 and 5. In some embodiments, leads identified as referral connections may be received by the system from an agent 130 or a system accessed by the agent 130. Identifying referral connections are described further below with reference to the flow diagram illustrated in FIG. 15. Business connection module 240 determines if any of the leads are referred by a business contact. For example, a real estate broker may be a business referral contact for loan customers. The system may recognize leads associated with the real estate broker and add a business referral connection. Company connection module 250 determines if a lead should be connected to a company or individuals at a company. For example, a lead may enter the system as a known employee of a company. If the associated company has other contacts, the lead may be set as a connection to that company and/or those individuals. Based on the lead's title or position in the company, the individual may be categorized by value or may be placed into a hierarchy within the company. In some embodiments, the relationship of individuals to companies or to individuals at a company may be identified by integration with one or more social networks. For example, after a lead is identified, the system may access information related to the individual at one or more social networking sites or databases to identify known relationships. The companies and/or individuals identified as relationships may then be added automatically as connections or may be provided as recommended connections. Connecting leads within a company is described further below with reference to the flow diagram illustrated in FIG. 15. In some embodiments, there may be fewer or additional modules in connection identification service 200.

In some embodiments, one or more of the modules in the connection identification service 200 may utilize social network data to more efficiently, thoroughly, or accurately identify connections. For example, in some embodiments the lead connection module 110 includes a social network service 270 which interfaces with one or more social networks 276. The social network service 270 may include a social network interface 274 which interacts with the social networks 276. For example, the social network interface 274 may operate through API's or other systems to access additional information or relationships of the leads received by the lead management system 100. In some embodiments, the social network service may also include a relationship identification module 272 which analyzes the data received from a social network. For example, the relationship identification module may analyze the data to determine that the social network data received from a social network 276 is referring to the same lead as the received lead. In addition, the relationship identification module 272 may analyze the relationships of a lead in a social network to determine which are applicable to the lead management system 100 and/or to format the relationships for use by the lead management system 100.

After analyzing the leads and identifying connections by the connection identification service 200, the lead and connection data may be passed to a connection generation module 280. The connection generation module 280 may generate the data to store lead connections in the lead management system 100. For example, the connection generation module may store generated connection data in a lead connection database 292, or as an attribute in a lead attribute database 294. In some embodiments, the lead connection data may be stored as a connection identifier in a lead connection database along with corresponding data indicating those leads which share the connection and the type of connection. For example, multiple leads which have been identified as duplicates may generate a connection between them. The connection may be stored as a unique identifier in a lead connection database along with unique identifiers for each of the leads sharing the connection. Thus, when any of the duplicate leads are scored, distributed, or otherwise accessed, the connection identifier stored as a lead attribute can quickly access the duplicate leads. In some embodiments, the connection identifier may also, or alternatively, be stored as an attribute of each of the duplicate leads in a lead attribute database 294. The system may then access the connection identifier in a leads attribute data and search for other leads which also have the same connection identifier as a lead attribute.

In some embodiments similar processes may occur for other connections besides duplicates. For example, a company may have a unique identifier which directs the system to other leads connected to the same company. As another example, a referral source may have a unique identifier to identify any leads referred by the source. In some embodiments, the lead connection database includes additional information about a connection, for example, the first date of the connection, the source of the connection (e.g. how identified by the system, a particular social network, or the like), value of the connection, agent or sales entity assigned to a connection, and/or other information which may be relevant to scoring, distribution, prioritization, and/or other processing or use of a lead.

In some embodiments, a unique lead connection identifier may be generated randomly for each connection. However, in some other embodiments, at least some lead connections may convey additional information about the connection. For example, the unique identifier may indicate the date it was first generated, the type of connection it represents, and/or the like. In some embodiments, the unique identifiers may be text which may be presented to an agent 130, a system administrator, or other parties and may represent understandable information. In some embodiments the unique identifiers may be stored as binary numbers which can then be interpreted by the system to identify information. For example, a specific bit may be set to one when generating the identifier to indicate whether the connection is a duplicate connection or not. In some embodiments, the unique identifiers are a combination of informative bits or text and randomly generated values.

After processing by the duplication connection module 230, referral connection module 230, business connection module 240, and company connection module 250, the lead is passed to a lead scoring module 115 to determine a lead score. The lead scoring module may take into account any information known about a lead and/or any leads that are connected to the lead. For example, a lead that would have a low value otherwise may be given a higher score based on high value connections that may be potential referrals later. Thus, the system adjusts the score for a lead based on the potential lifetime value of the lead and referrals from the lead. In some embodiments, the leads may be scored by lead scoring module 115 before being processed by the lead connection module 110. In some such embodiments, the leads may also be scored by the lead scoring module 115 after connections are identified. After scoring, the lead is passed to a distribution module 120. The distribution module 120 determines which agent to assign the lead. The lead may be assigned based on connections to other leads associated with an agent, based on a lead score, based on rules associated with agents, based on workload of agents, and/or the like, or a combination of factors. After determining which agent to distribute a lead to, the lead is prioritized within a list of leads assigned to the agent by prioritization module 260. The prioritization may be based on any set of rules. For example, high value duplicate leads may be prioritized ahead of multiple inquiry duplicate leads, which may be prioritized ahead of non-duplicate leads. In some embodiments, the prioritization is based on the lead score, which may include information about duplication or referral connections. After prioritization, the lead 210, along with associated connection data and score are presented to an agent 130. In some embodiments, the prioritization module operates as part of an agent's systems.

Figure 3:
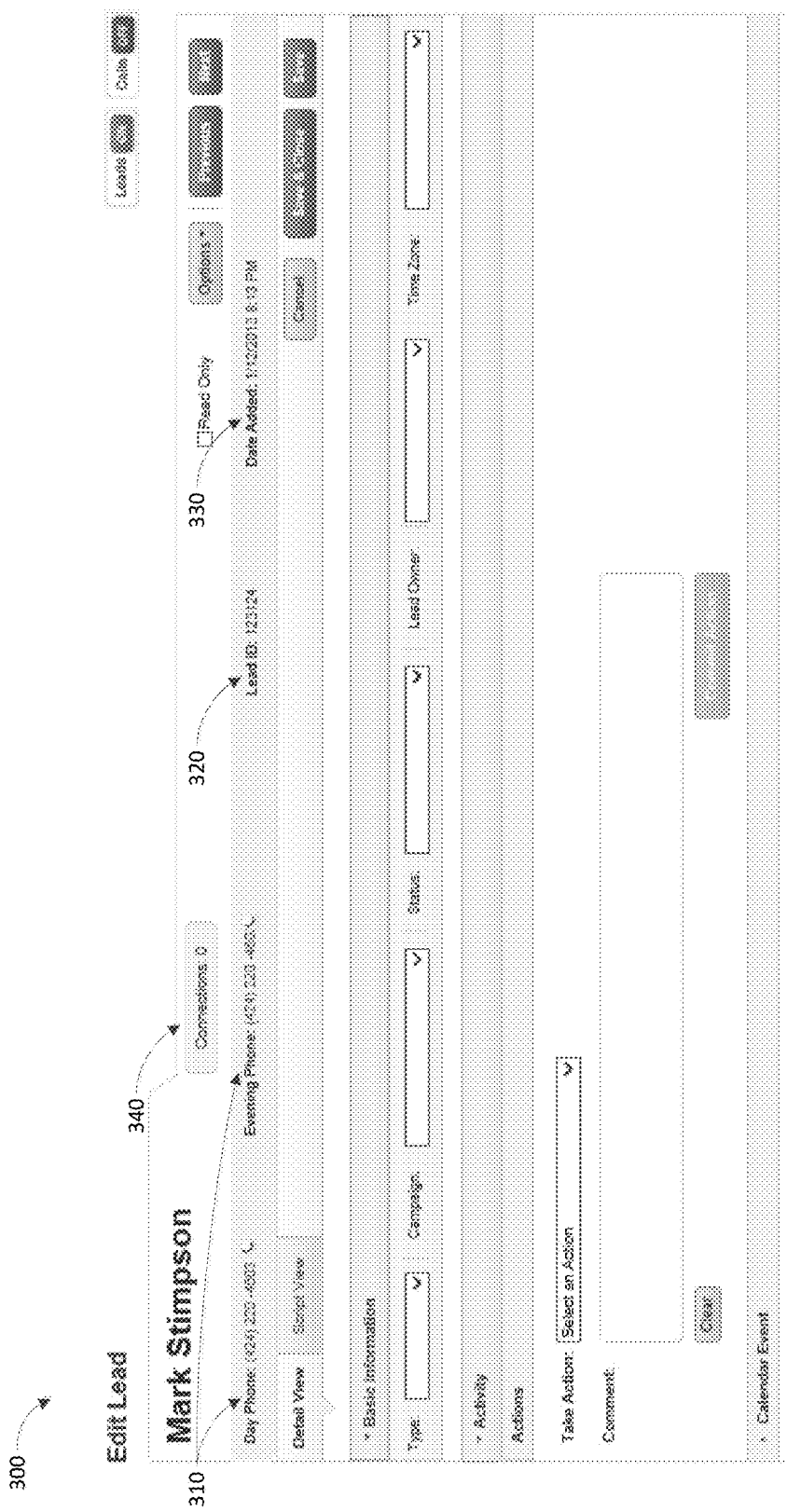

User Interfaces:

FIGS. 3-7 illustrate example user interfaces which may be used in an embodiment to enable a user to add a connection, such as a referral, to the data associated with a lead. FIG. 3 illustrates an example of a user interface 300 enabling a user to edit a lead as used in an embodiment. The user interface includes basic contact information for the lead such as one or more contact telephone numbers 310. The lead also includes a lead ID 320 and information about when the lead entered the system 330. The lead detail page shown enables a user to edit the lead information or add actions related to the lead. For example, a user may be able to add or edit contact information. The user may also be able to make notes about actions taken regarding the lead, such as contact attempts. The user interface also includes a selectable indicator 340 giving information about lead connection and enabling a user to add or update connection information.

Figure 4:
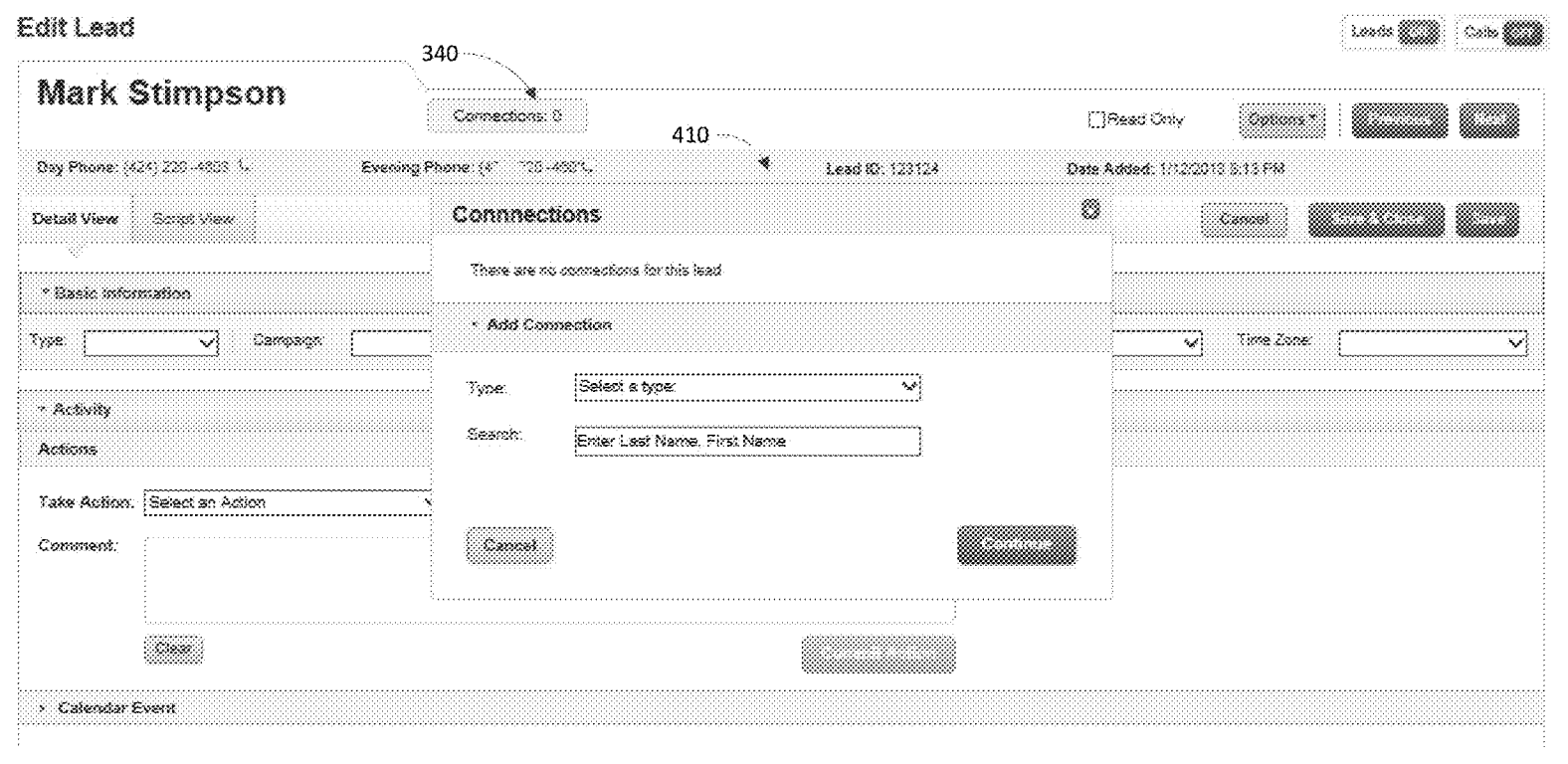

FIG. 4 illustrates an example user interface that may be used to initiate the process of adding connection data to a lead as used in an embodiment. The user may select the connections indicator 340 that opens a pop-up window 410 with options to add connection data. In some embodiments, instead of a pop-up window, the user may be redirected to another window, or given other options to enter connection data. The user may be given the option to enter a connection type and search for a lead to connect.

Figure 5:
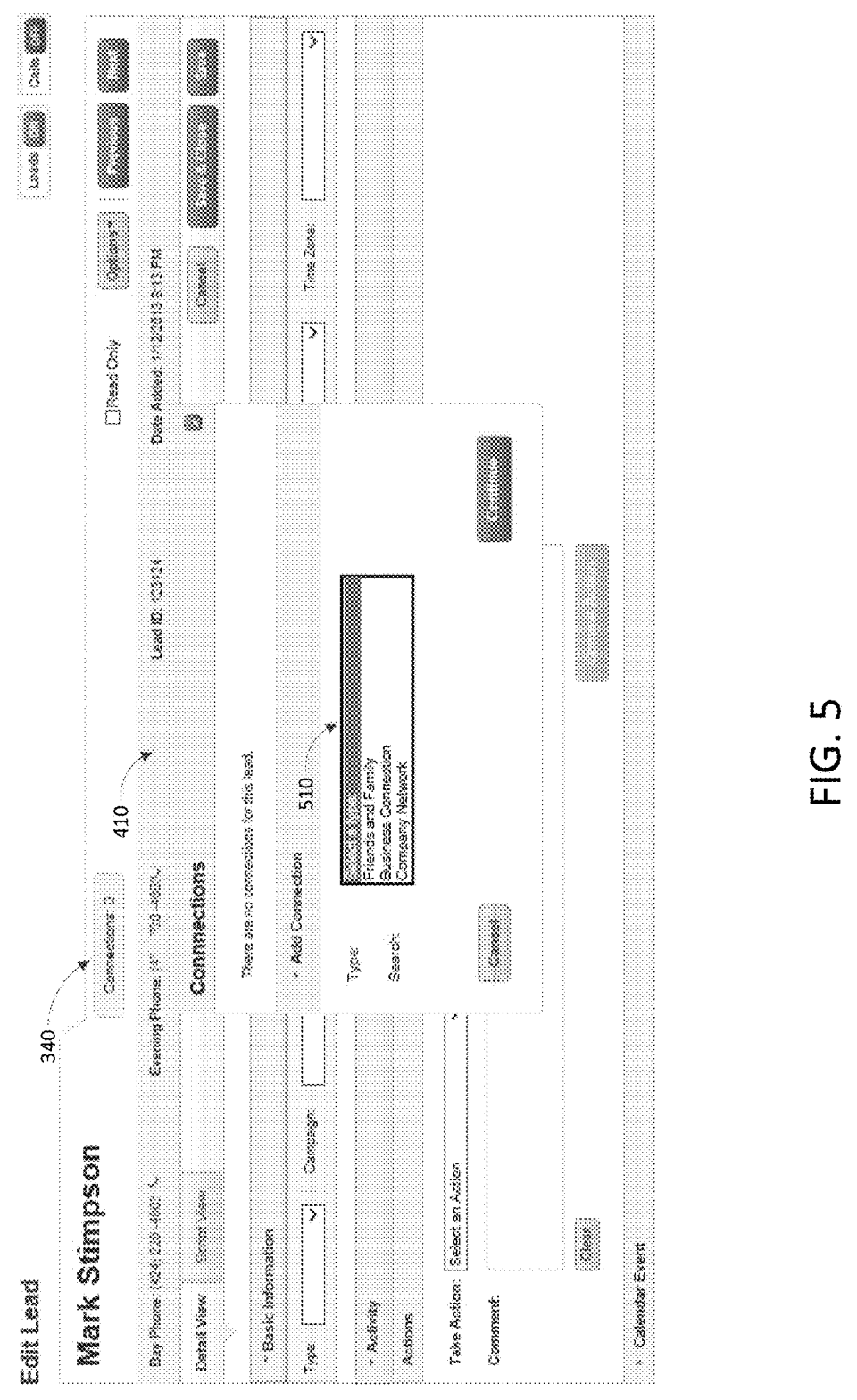

For example, moving to FIG. 5, in a connections drop down menu 510, the user is given the option to enter the connection as a "friends and family" connection, a "business" connection, or a "company" connection. In some embodiments fewer or additional connection types may be offered as options to the user. The user may search for a lead using the search option illustrated in FIG. 4 or may enter data for a new lead to add as a connection. For example, if the connection is a new referral, the lead may not be stored in the system.

Figure 6:
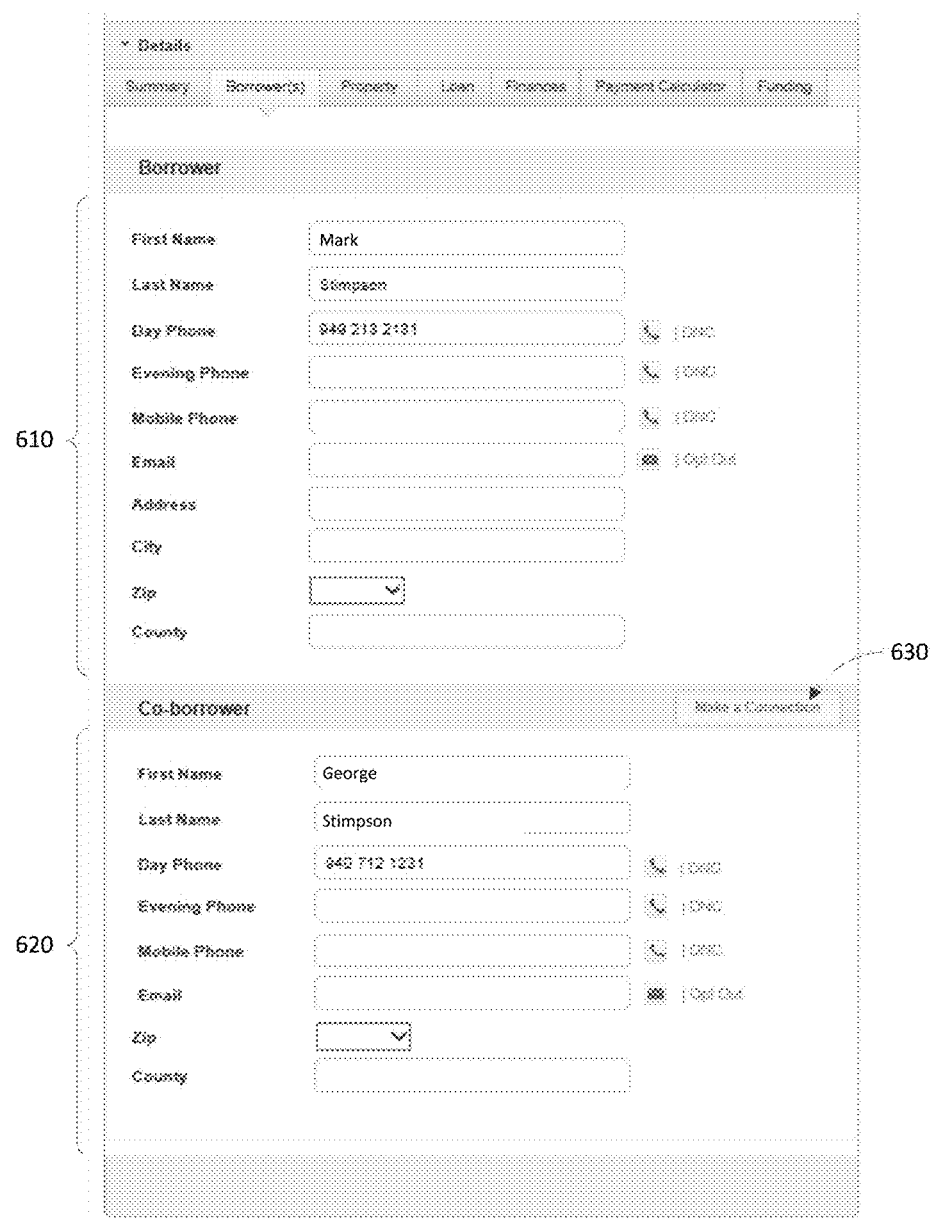

In FIG. 6, the user is given the option to enter information about a lead to make a connection. In the example user interface shown in FIG. 6, the user is able to list as a connection a co-borrower for a loan. The user is presented with known information about the current lead. In this case the example user interface shows "Mark Stimpson" and a contact phone number in section 610 of the user interface. The user is also presented with a section 620 of the user interface to enter information related to the lead that is to be connected. In some embodiments, some of the information is required to be entered by the user before a connection can be made. For example, the user may be required to at least enter one contact telephone number. The user interface in FIG. 6 includes a Connection button 630, which if selected creates a connection in the computer system between the two leads. In some embodiments, the user may also be able to provide additional information about the connection type. For example in FIG. 6, the connections are listed as borrowers and co-borrowers, but other connection types are available.

Figure 7:
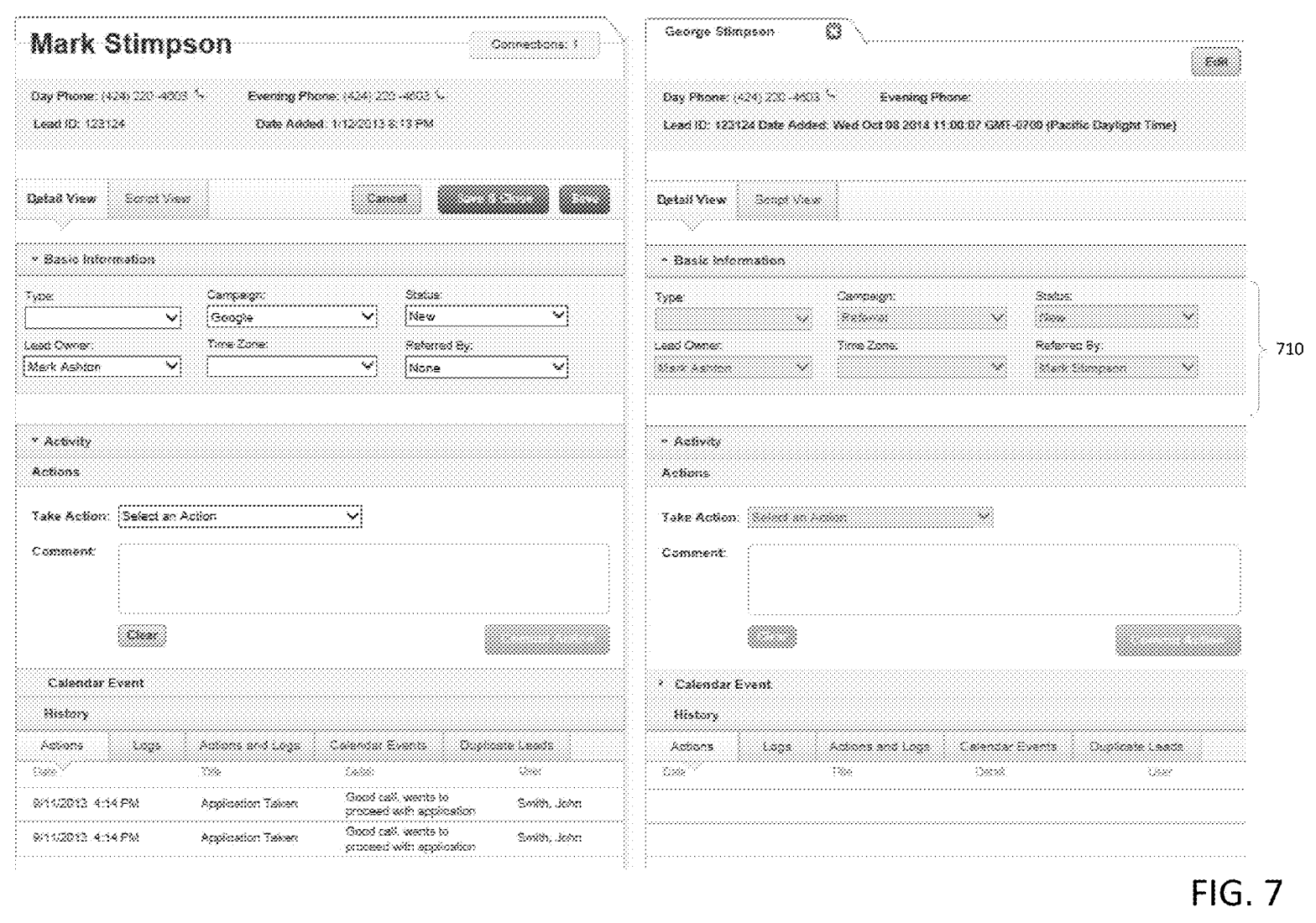

FIG. 7 illustrates an example user interface illustrating the connection generated by the user interface in FIG. 6. The user interface illustrates contact information about each of the leads. The user interface also includes connection data in the basic information section 710 of the referred lead. In this example, the referred lead is listed as such, and data about the referral source and assigned agent is stored in the system. As discussed further below, the leads may be assigned to the same agent to better address the referral.

Figure 8:
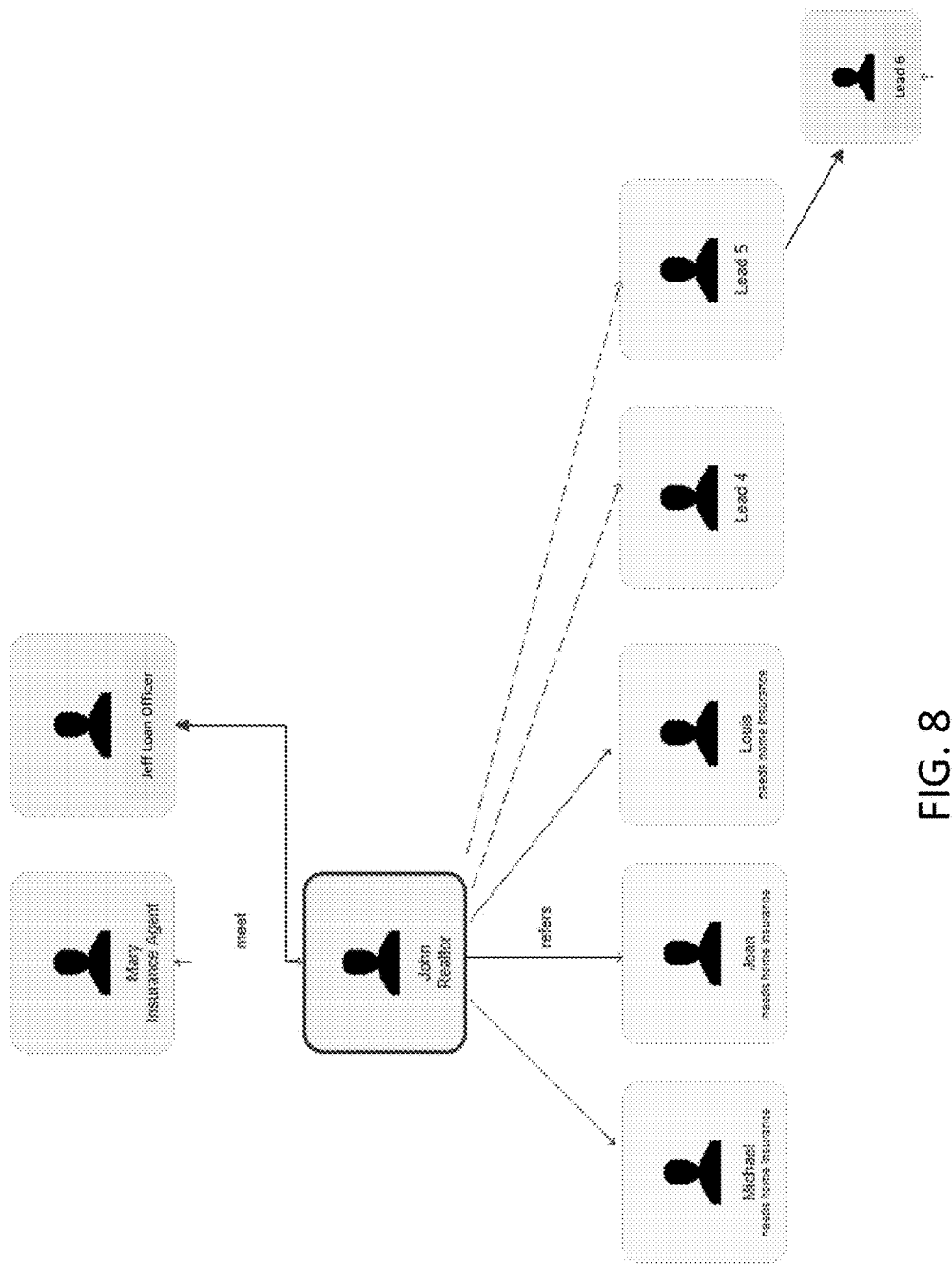
FIG. 8 is an example of a business connection referral network that may be implemented as part of a lead connection system.

FIG. 8 illustrates an example of a business referral network that may be represented in connection data stored in an embodiment of the disclosed systems. In the illustrated referral network, a realtor has referred five leads to an insurance agent. Tracking the leads and connections may enable the lead management system to track the value of a lead or referral source based on the connected referrals. In addition to insurance agents, the system may use referral networks to track connections to buying and selling realtors by a loan officer and referrals from an existing business connection that refers to a contact at another company who may also be interested in similar services.

Figure 9:
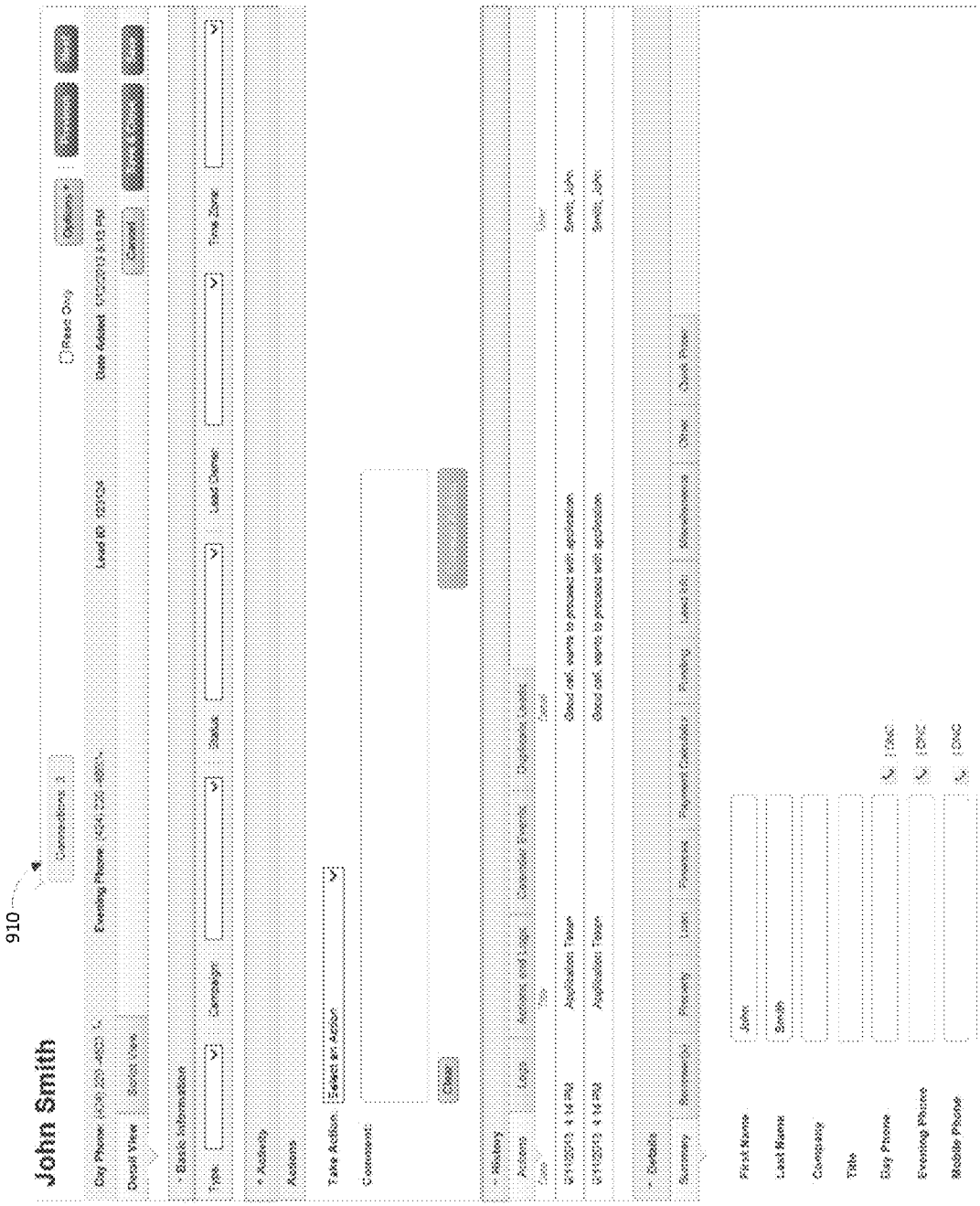
FIGS. 9-10 show examples of user interfaces that may be implemented as a part of a lead connection system, as used in an embodiment.
Figure 10:
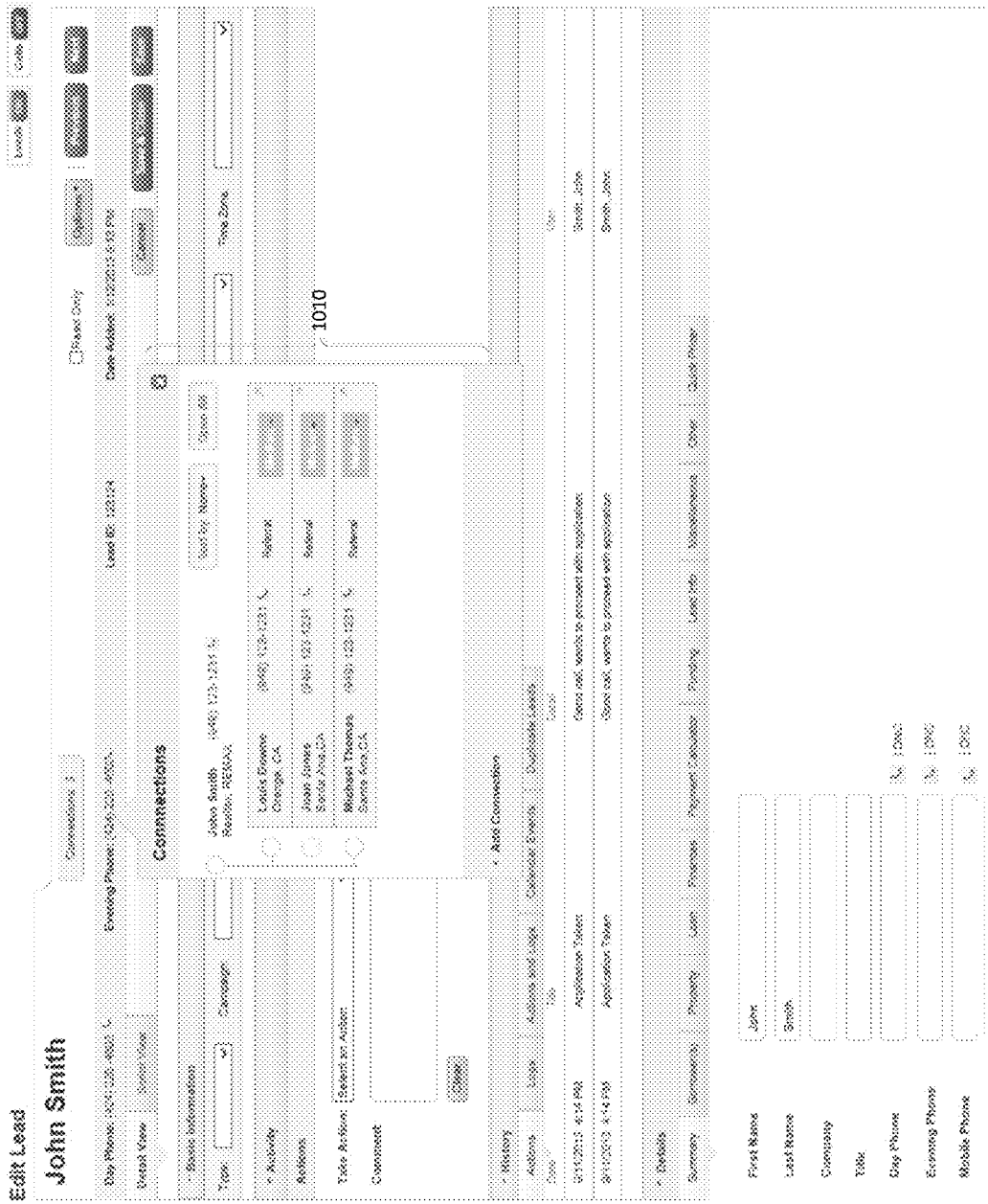

FIG. 9 and FIG. 10 illustrate example user interfaces that may be used to add business referrals as used in an embodiment. FIG. 9 shows information about John Smith, including a connections element 910 indicating that the lead has three connections. By selecting the connections element 910, a user may be able to access and/or edit information about the connections. As shown in FIG. 10, John Smith has three connections, which show up in a connections pop-up window 110. In this example, each of the connections is an additional contact that was referred by John Smith. The connection type is noted along with contact information for each connected lead. The user may add new connections or click on one of the connections to add or edit information about the contact. The user may also select the contact information to initiate a phone call or other communication. Seeing the connection data for a contact may enable the user to personalize the communication based on shared connections.

Figure 11:
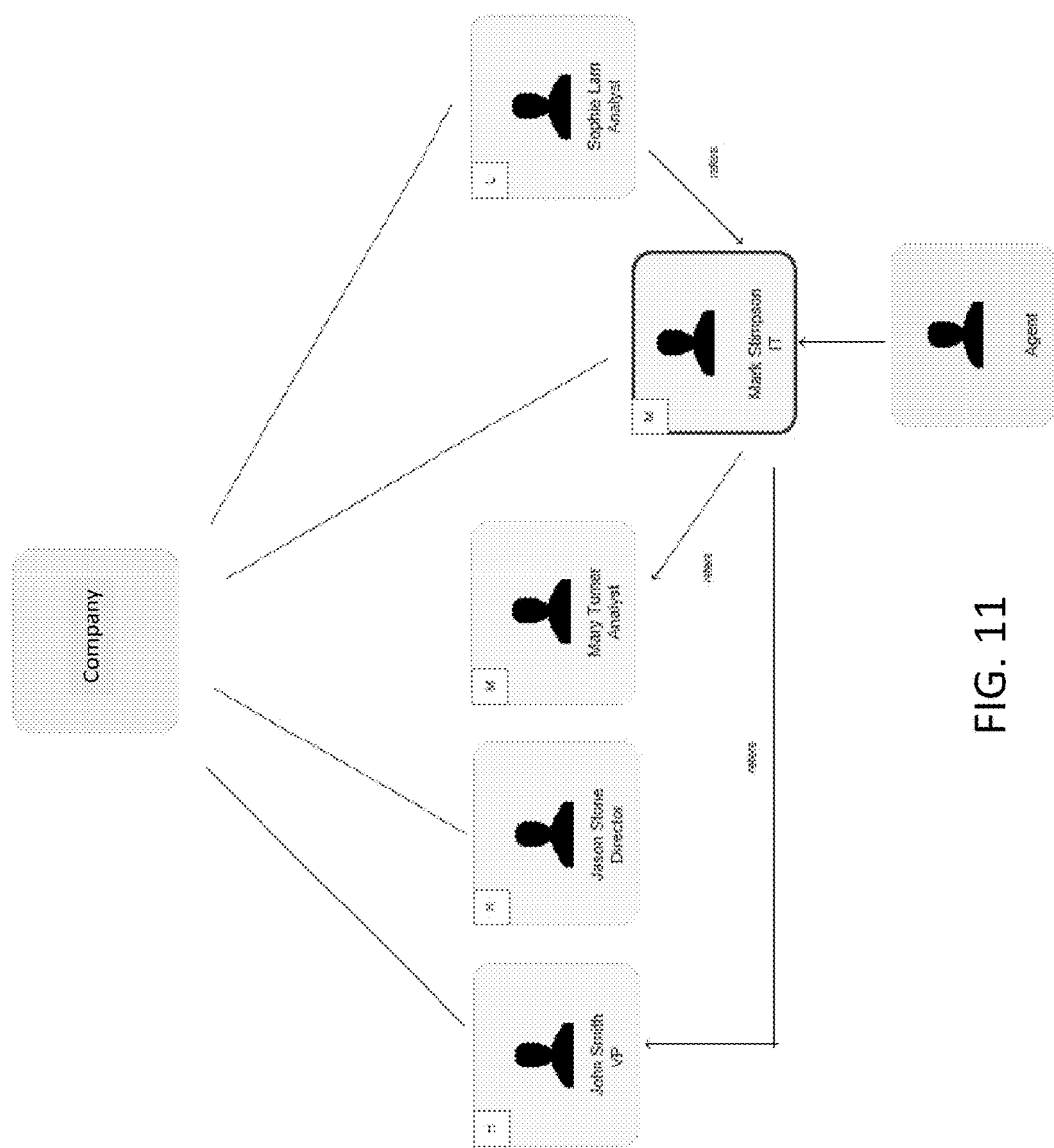
FIG. 11 is an example of a company referral network that may be implemented as part of a lead connection system.

FIG. 11 illustrates an example of a company referral network that may be represented in connection data stored in an embodiment of the disclosed systems. In the illustrated network, five individuals are known to work for a single company with varying decision making abilities. An agent may only have had contact with one individual at the company originally, but may have been referred by that individual to others at the company. For example, an agent may have received Mark Stimpson as an original lead who then referred the agent to Mary Turner, Sophie Lam, and John Smith. The system may then establish and store connections between those individuals. Another individual Jason Stone may be identified as a lead through social network data accessed by the system. For example, he may be listed as working at the same company. The agent may see that Jason Stone works at the same company and then ask Mark Stimpson for a referral to Jason Stone.

Figure 12:
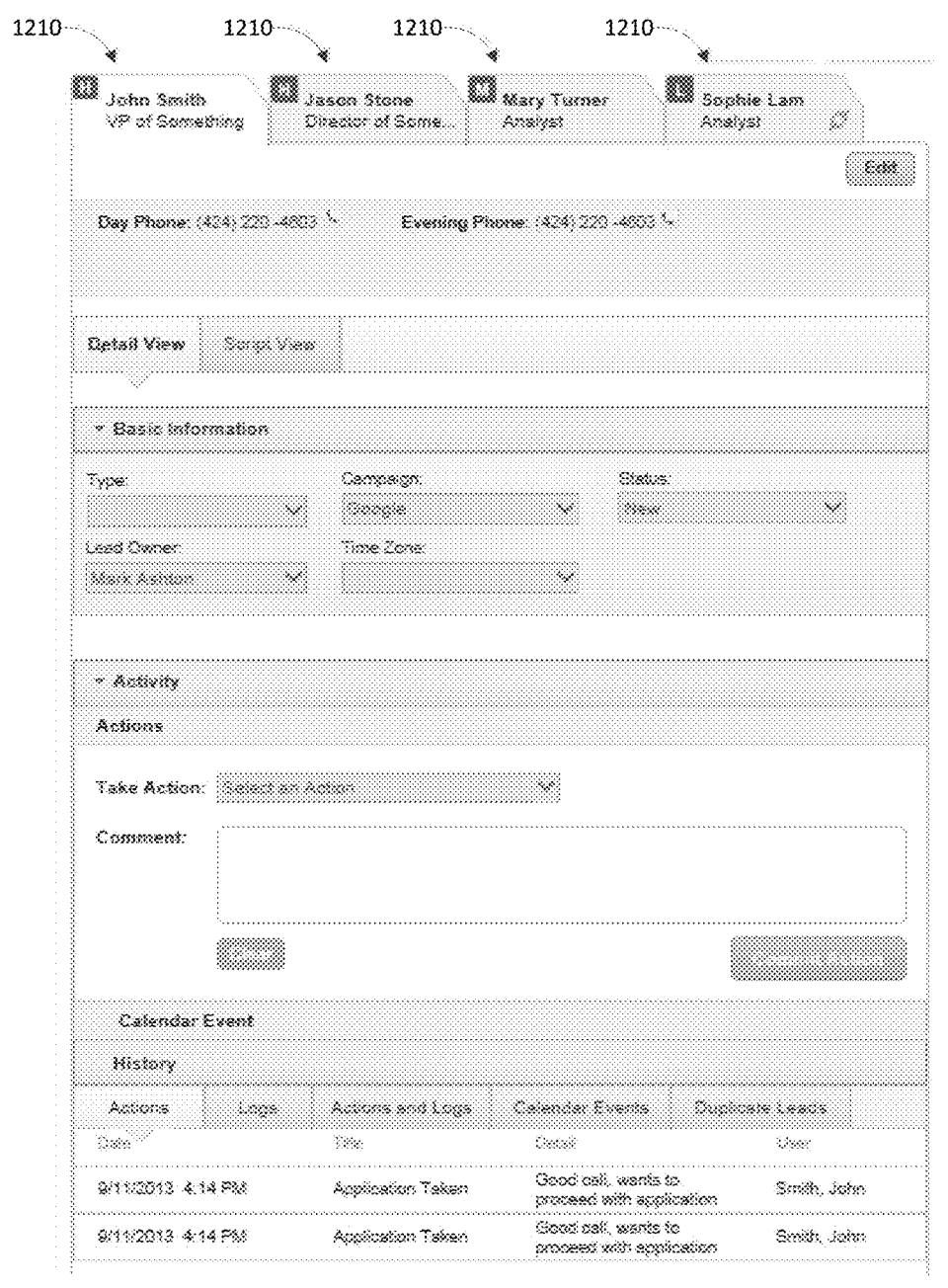
Figure 13:
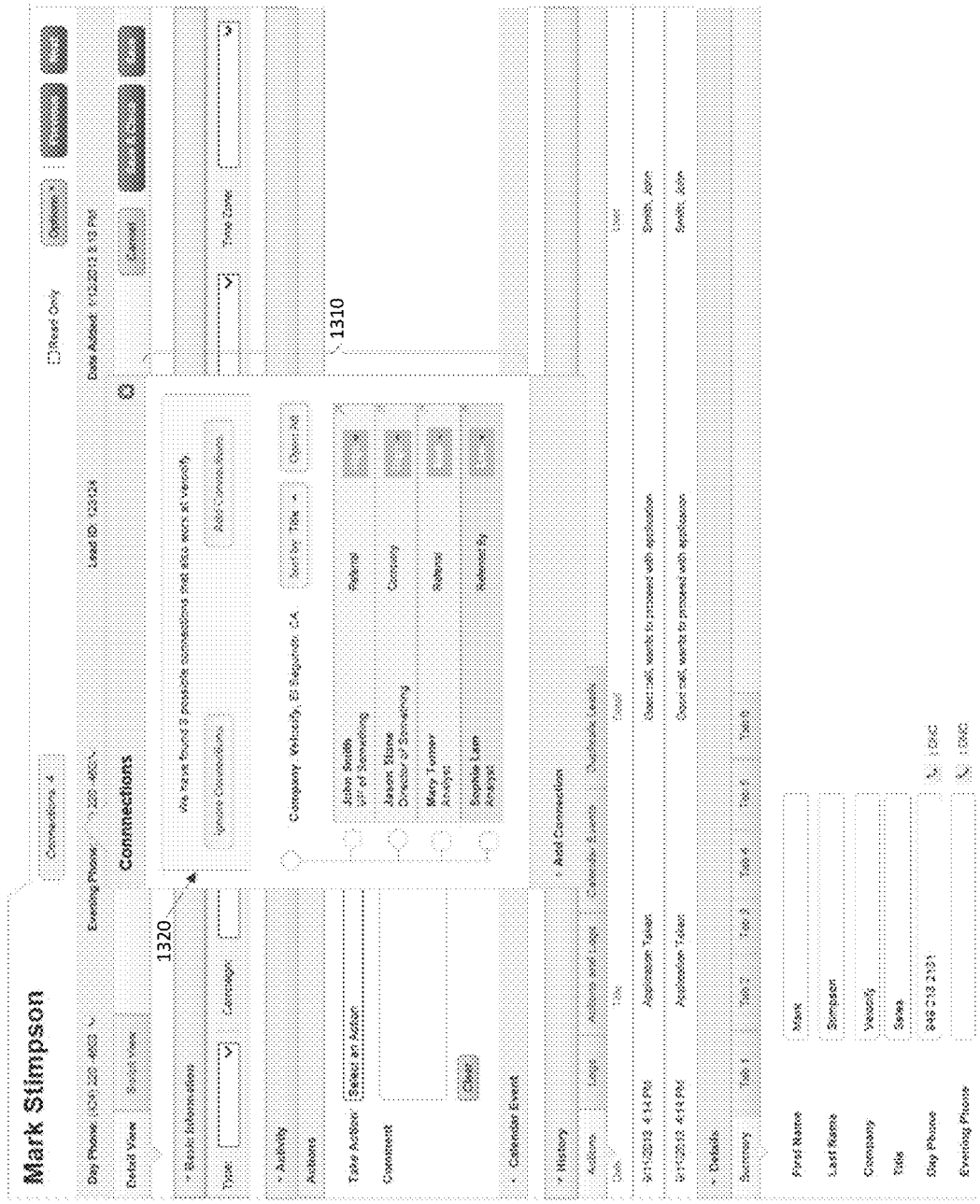
Figure 14:
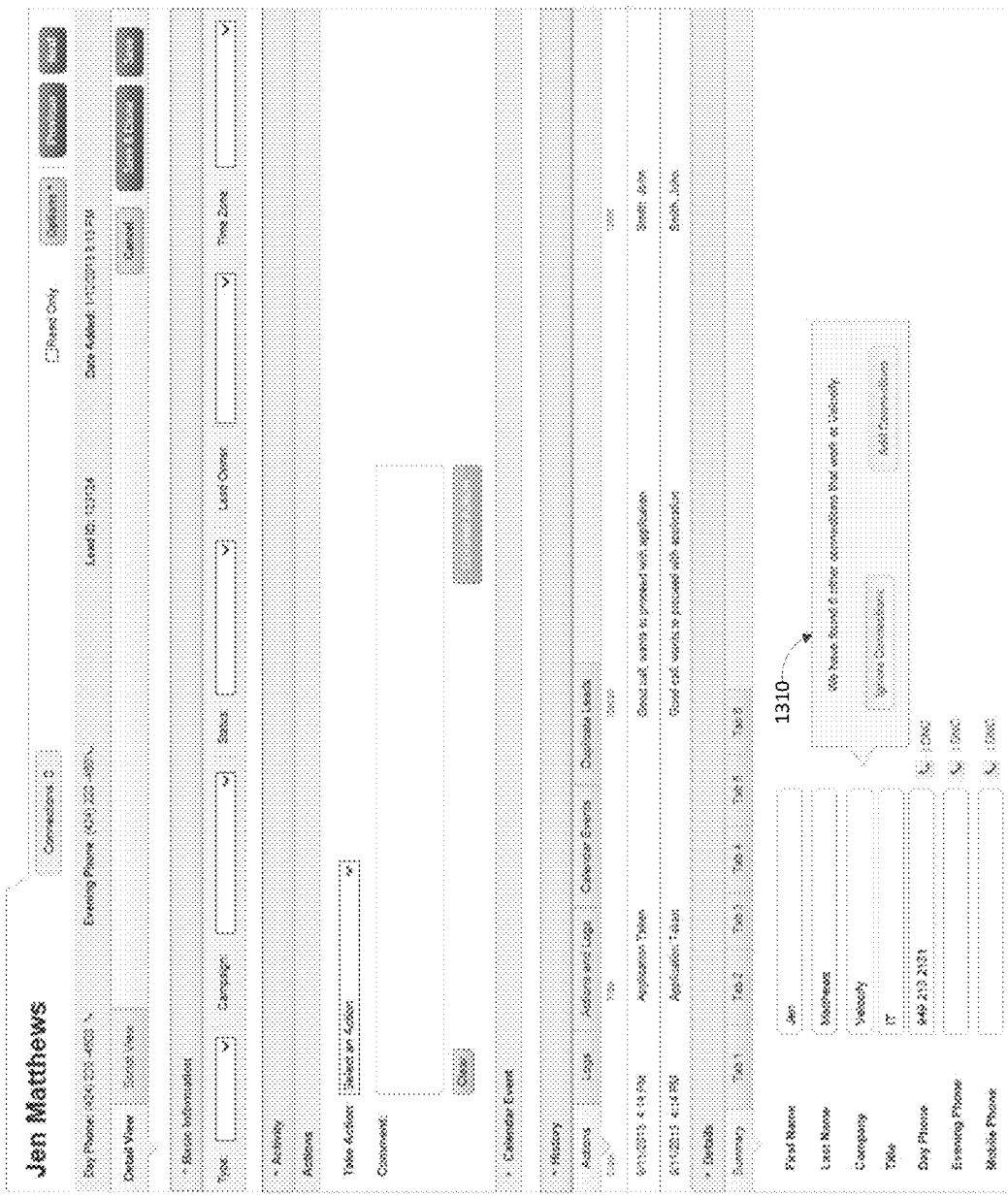

FIGS. 12-14 illustrate example user interfaces that may be used to view and/or add connection data within a company as used in an embodiment. In FIG. 12, the user is shown an interface with multiple contacts 1210 shown as connected through same company. The tabs at the top allow fast browsing between individuals connected at the company. When an individual at a company is viewed by a user, the tabs may be automatically populated with the known connections at the company. Viewing profiles of the connected individuals may enable better coordination between efforts to contact each of the individuals. The individual connections may also include an indication of the connections importance at the company. For example, the connections in FIG. 12 include an "H", "M", or "L" associated with the lead indicating a high, medium, or low importance or decision making ability at the company. In addition to importance, the indicators may be used to show rank in a company, strength of connection, priority of contact, or other information helpful to understand the connections.

FIG. 13 illustrates another view of a profile of an individual that works at a company. The user interface shows known connections to the lead that are associated with the same company in a pop-up window 1310. The known connections are listed as well as how they are connected and an indication of importance within the company. For example, John Smith is a high importance referral at the same company, while Sophie Lam is a low importance connection that referred the currently viewed lead. The system also includes an indication 1320 of recommended connections to add that are known to work at the same company. For example, in some embodiments the recommended connections may have been identified through social media. In some embodiments, each of the recommended connections each have a connection stored within the system that indicates the individual works for the same company. The user may select to add the new connections or ignore them. FIG. 14 illustrates another embodiment of a user interface with an indication 1320 of recommended connections at the same company. When entering a new contact into the system, or updating the contact's information, the system has recommended may provide recommended connections in response to entering or updating the company the contact works for. The user can then quickly add a connection within the company as prompted.

Figure 15:
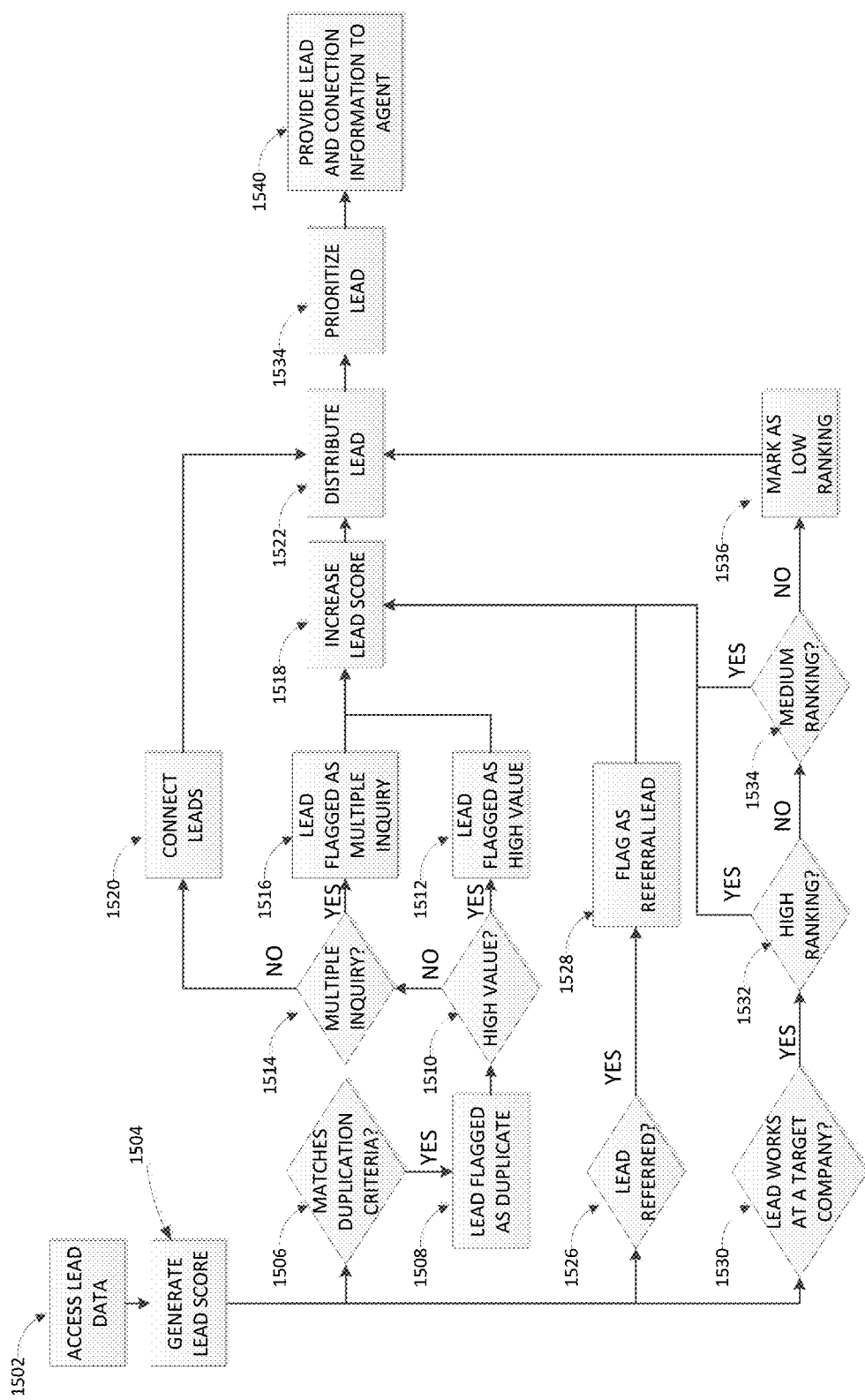
FIG. 15 illustrates an example flowchart illustrating processing of a lead by a lead connection system.

Connection Processes:

FIG. 15 illustrates an example block diagram showing processes used as part of the lead system to generate connection data for a lead. In one embodiment, the process of FIG. 15 is performed by the lead connection module 110, such as by one or more of the modules 220, 230, 240, 250. In one embodiments, the method of FIG. 15 may be performed by another computing systems that is suitably configured. Depending on the embodiment, the method of FIG. 15 may include fewer or additional blocks and the blocks may be performed in an order that is different than illustrated.

In block 1502, the system receives a new lead. In addition to performing the processes for a new lead, the process may analyze new connections added to a lead and/or analyze previously added leads for new connections. For simplicity, the processes described below are discussed as if applied to a new lead. In block 1504 the system generates a score for the lead. In some embodiments, the lead score is generated after connections are added or only when the system prepares to distribute leads. Leads may be scored on various attributes of the particular lead in order to determine a quality of the lead with reference to other leads, a likelihood that the lead will convert, and/or other characteristics of the lead. U.S. patent application Ser. No. 14/091,869, entitled LEAD SCORING, filed on Nov. 27, 2013, which is hereby incorporated by reference in its entirety, describes various lead scoring attributes and methods that may be used as part of the lead score generation process of block 1504.

After generating a score for the lead (or multiple scores for the lead that indicate different attributes of the lead), the lead is analyzed for three different types of connections (duplications, referrals, and company connections) in blocks 1506, 1510, and 1514. Starting with block 1506, the system checks the lead data against duplication criteria. Duplication criteria may include determining the likelihood that the new lead is the same as a previous lead, such as based on a comparison of multiple values of the lead with other leads. For example, if a last name, first name, and street address field of the lead accessed at block 1502 is the same as the last name, first name, and street address field of a lead already stored in a database (e.g., which includes a list of leads associated with a particular entity for which the new lead was received), the new lead may be identified as duplicate in block 1506. In other embodiments, other tests for determined duplicate leads may be performed. In this embodiment, if the lead is determined to be a duplicate of a previous lead, the lead is flagged as duplicate in block 1508. The flag may indicate to the system that the duplicate connection needs to be analyzed further. If the lead is not identified as a duplicate, the system may not continue from block 1506 to block 1508. Instead the system may determine other characteristics of the lead in blocks 1526 and 1530. If the lead is not identified as a duplicate in block 1506, a referral in block 1526, or a lead with company connections in block 1530, the system may continue to block 1522 to distribute the lead to an agent without performing the other processes shown in FIG. 15.

Moving on to block 1510, the system determines if the duplicates should be flagged as high value. Duplicate leads may be flagged as high value if they are received from different sources within a set time period, for example, within 24 hours. Determining high value leads is discussed further with reference to FIG. 16 below. Leads that are determined to be high value are then flagged as high value in block 1512.

If the lead is not high value (block 1510), the method proceeds to block 1514, wherein the system determines if the lead is a multiple inquiry lead, such as a lead that has a continued interest in the product or service offered by the entity for which the leads are processed (e.g., a retail customer of a lead processing, calling, management, etc., entity), which may indicate a higher value of that lead. A lead may be considered a multiple inquiry lead if the lead has inquired about products or services with at least a threshold amount of times between the inquiries. For example a potential student inquiring about classes at the start of a semester and then inquiring again a year later may be categorized as multiple inquiry leads. The number of inquiries and interval may be set by the particular entity selling the product or service. For example, a retail entity (e.g., a car dealership, department store, etc.) may set a criteria that a multiple inquiry lead is one that has requested information regarding a product of the retail entity at least three times, with at least one week in between inquiries, from two or more different lead sources (e.g., a website, radio added, mailer, etc.). Any of various combinations of such criteria may be used to define multiple inquiry leads. If a lead is identified as multiple inquiry, it is flagged as such in block 1516.

If a lead is flagged as a high value or multiple inquiry lead, the system moves on to block 1518 and the lead score determined in block 1504 is increased. The lead score may be increased by a set amount based on the type of flag, or may be increased by an amount based on a calculation of the leads value. For example, in some embodiments, a lead score may be increased more if the lead has entered information in five sources in the last two hours than if the lead has entered information into two sources in the last six hours. Both leads may be flagged as high value, but determining the change in score may take into account the precise circumstances of the lead. Similar processes may be used to determine a score increase for multiple inquiry leads. In some embodiments, some lead connections may also decrease a lead's score or prioritization. For example, if a referral source has been identified as less credible than other sources, leads referred from the source may have a lead score decreased. In another example, leads with repeated contact attempts that have not purchased a product or service may have a lead score decreased based on knowledge that additional contact is unlikely to lead to a positive result.

If a lead is not identified as multiple inquiry or high value, the process continues to block 1520 and the leads are connected in the system. In some embodiments the leads may be connected without a requirement to merge leads. Maintaining separate leads enables the system to track the lifecycle of a lead as well as maintain all data about the lead. If the lead is flagged as multiple inquiry or high value in bocks 1510 or 1514, the lead may also be connected in the same manner (e.g., the method may continue from blocks 1512 or 1516 to block 1520 in some embodiments). After processing the lead for duplicates and flagging, connecting, and/or updating a score for the lead, the system then distributes the lead at block 1522 and prioritizes the lead at block 1534, each of which are discussed further below.

In addition to processing the leads for duplicates, the system may determine if a lead was a referral at block 1526. For example, the process of determining whether a lead is a duplicate (e.g., block 1506), whether the lead was referred (e.g., block 1526), and whether the lead works at a target company (e.g., block 1530) may all be performed concurrently in some embodiments, or may be performed in serial in other embodiments. A referral may be a family and friend or business referral as discussed above. In some embodiments the system determines if the lead is a referral based on the leads origin. For example, if the lead is entered into the system by a user making a connection through a user interface, such as is shown in FIGS. 4-6, the system may automatically flag the lead as a referral. A lead may also be set as a referral if a third party enters the information into the system as a referred lead. If a lead is determined to be a referral, in block 1528 the lead is flagged as a referral. The flag may include information about the source of the lead referral in a connection as well as information about the type of referral. Based on the higher value of referred leads, the lead score is increased in block 1518 before passing the lead for distribution and prioritization in blocks 1522 and 1534.

In some embodiments, leads may also be processed to determine if they are part of a company referral network in block 1530. For example, the lead may be one of a number of people that are being contacted at a company to make a sale. To increase the likelihood of making a sale the leads should be contacted in a coordinated manner. Thus, when leads enter the system and include company information, the leads may be flagged as connected to the company. In some embodiments, the system in block 1530 may interface with one or more social networks to determine additional individuals which may be preferably contacted at a company and identify those individuals as recommended leads. The recommended leads may then be presented to an agent such that the agent may seek a referral from one lead to the recommended leads. The system may perform various analysis on the lead in order to identify if the lead is related to other leads associated with the entity. For example, a lead may have an indication of a company that can be compared to such company indications in order to identify matches. If the lead is associated with the target company the system may determine the importance of the lead to the company. For example, in FIG. 15, the system determines if the lead is high, medium, or low ranking in blocks 1532, 1534, and 1536. The determination of ranking within a company may be determined by the individual's position or title within a company. In some embodiments, the ranking is also based on the campaign. For example, if the company is targeted for insurance products, a person in the IT department may be flagged as low ranking, but if the company is targeted for a software product, the same individual in the IT department may be flagged as high ranking. In some embodiments, the ranking information is provided by entity selling the product or service, such as a retailer. For example, a listing of positions of high value to the entity may be provided, such that leads having those positions are given a higher lead score.

In some embodiments, the lead score is increased for a lead based on the leads ranking at the company. For example in FIG. 15, high and medium ranking leads have the lead score increased by the system in block 1518, but low ranking leads do not. In some embodiments all leads in a company network may have their lead score increased, but the level of change may be based on the rank or connectedness within the company. Leads within a company may also have connection data added to them indicating a connection to the company, as well as which individuals within the company the individual knows or a place in a hierarchy within the company.

Continuing to block 1522, after processing a lead for duplications, referrals, and company information, the data is passed to a distribution module. If a lead is not identified as a duplicate, referral, or company connection, the lead may be passed directly to the distribution module without being flagged as a particular type of lead. The distribution module processes various lead data, including lead connection data, and distribute leads to the most appropriate agent or team. For example, leads with high scores may be passed along to a set of agents with the best historic performance. In some embodiments, the system may be configured to distribute leads using techniques similar to those described in U.S. patent application Ser. No. 14/091,876, entitled LEAD DISTRIBUTION, filed on Nov. 27, 2013, the entirety of which is hereby incorporated by reference herein. Leads may also be distributed based on other criteria. For example, a lead flagged as a referral may be distributed to the same agent that is assigned to the referral source. Likewise, a lead at a target company may be assigned to an agent assigned to the target company. Duplicate leads may be assigned to an agent that has been in contact with the lead previously.

Moving on to block 1534, the leads are prioritized for the agent. Prioritization may be based on the lead score generated in block 1504 and possibly updated based on recognition as a duplicate lead, referral lead, or higher or medium ranking lead in block 1518. Prioritize of leads at block 1534 may incorporate various analysis, such as any of those described in U.S. patent application Ser. No. 14/091,869, entitled LEAD SCORING, filed on Nov. 27, 2013. Leads may also be moved to the top of prioritization based on the leads status as flagged as a duplicate, referral, or company connection. For example, a high value lead may be prioritized ahead of all other leads based on the urgency to respond even if the lead score is not as high as for other leads. In some embodiments, both the lead and a duplicate, referring, other leads within a company, or other connected leads may all be increased or decreased by the system in block 1518.

In block 1540, the lead and connection information is passed to the agent selected in block 1522. The agent may be provided with information on any and all connections flagged by the system. For example referral and duplication information for a lead may be passed to the agent and put into the front of the user interface for the agent so the agent can use the information when contacting the lead. If the lead is a duplicate, the system may pass information to the agent on the current lead as well as a link to previous contact attempts and information from the lead or leads recognized as duplicates.

Figure 16:
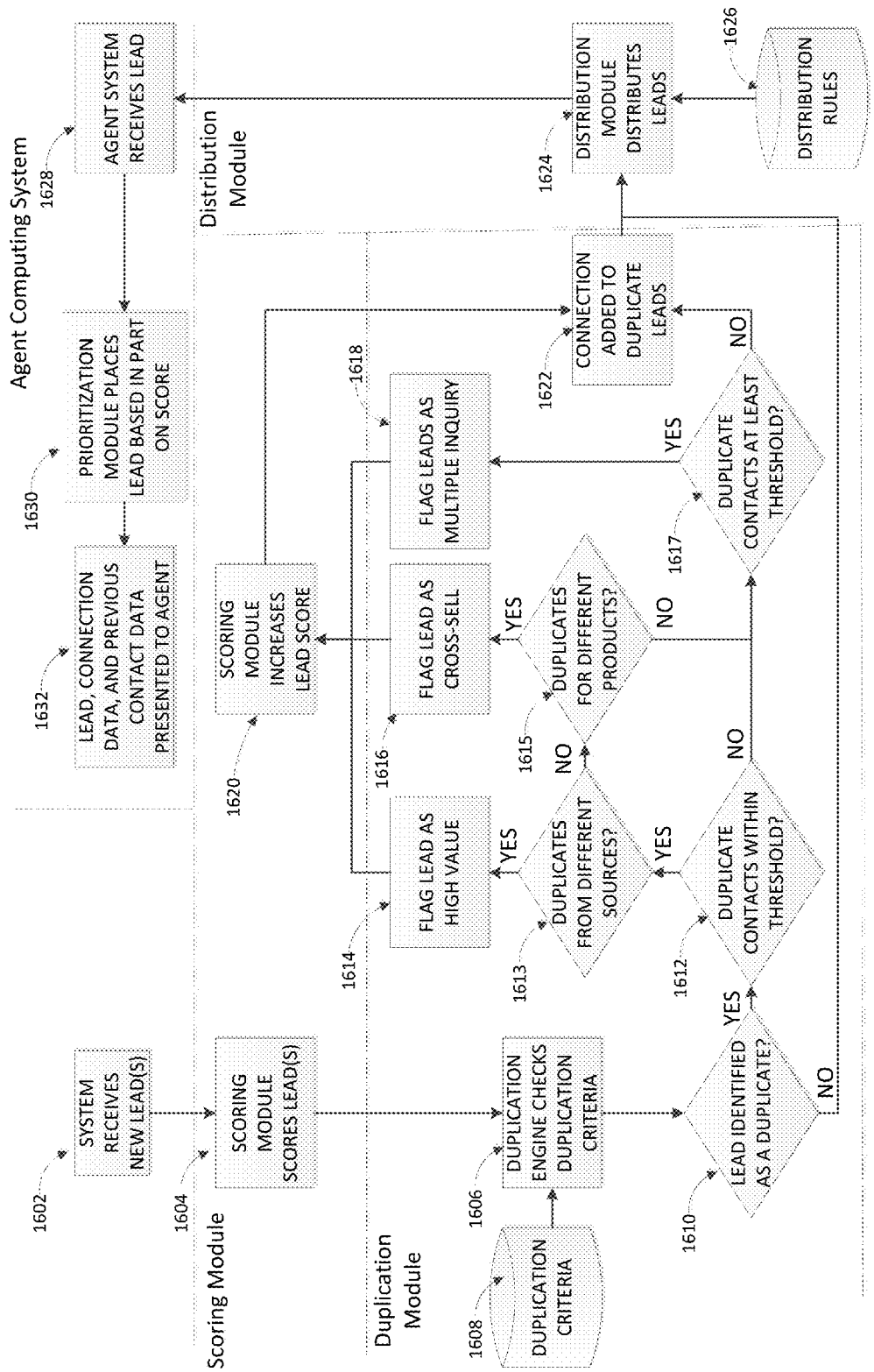
FIG. 16 illustrates an example flowchart illustrating processing of a lead by a de-duplication component of a lead connection system.

FIG. 16 illustrates an example block diagram showing processes used as part of the lead system to detect and use duplicate lead data. In one embodiment, the process of FIG. 16 is performed by the lead management computing system 1700 (FIG. 17), such as by one or more modules indicated therein, or any other computing systems that is suitably configured. Depending on the embodiment, the method of FIG. 16 may include fewer or additional blocks and the blocks may be performed in an order that is different than illustrated.

Beginning in block 1602, the system receives a new lead. In some embodiments, the system may analyze a set of leads received at the same time, for example a database of leads entering the system. Moving on to block 1604, the system generates a score for the lead. The score may be based on, for example, the likelihood that the lead will be contactable, the likelihood that the lead is interested and/or qualified to purchase an organization's product or service, the likelihood that the lead will contribute revenue to the organization, the expected timeframe in which the lead will contribute revenue to the organization, the expected revenue that the lead will contribute to the organization, the anticipated profitability of the sale to the lead, the expected lifetime value of the lead if they become a customer, and/or the like.

Moving on to block 1606, the system determines if a lead is likely a duplicate lead. For example, the system may check the lead against a set of duplication criteria 1608 that test the lead against other leads. For example, the lead may be compared to other leads based on first and last names, address, geographic region, company, industry, purpose of inquiry, contact information including phone numbers, or other information known about the lead, as well as other information such as the method of contact.

In block 1610, the system determines based on the result of testing against other leads if the lead should be treated as a duplicate. If the lead is not determined to be a duplicate, it is not processed as one and continues on to the distribution system to distribute to an agent based on other criteria. If the lead is determined to be a duplicate, the system analyzes the contact history to determine how to treat the lead.

Moving on, the duplication module determines if the duplicate leads have additional value over the duplication. In block 1612, the system determines if the duplicate leads attempted to make contact within a threshold period of time. If so, the lead may be a high value lead or a cross-sell opportunity. Moving on to block 1613, the system determines if the duplicate leads are from different sources. If the duplicate leads are from different sources, the system flags the lead as high value in block 1614. A lead may be considered high value if the contact history indicates that the lead is ready to buy and should be contacted immediately. One such example is if an individual seeking a loan inquires about loans on two different pages in less than 24 hours. The duplicate inquiries from an individual in such a short time period indicate the individual is ready to make a decision. For example, an individual may see his dream home on real estate listing webpage and fill out a form on that page to seek approval for a loan for the property amount. The same individual may then fill out another form on a loan webpage based on an advertisement on TV and seek approval for a loan in the same amount. Finally, the same individual may fill out another webpage looking for loan options on a financial services site which provides loan options from multiple lenders users based on information entered. The system may recognize the same new lead entering the system 3 times in just a couple hours and flag the lead as "high value." The flow diagram in FIG. 16 may be configured to recognize when some duplicate leads that meet some criteria are not really high value. For example, if an individual enters the same information on the same webpage within a few minutes, it is more likely that the individual had difficulty with the website than that the individual is a high value lead. Depending on the product or service sought, the system or a user may change some criteria for determining when a lead is high value. For example, a loan inquiry may require multiple inquiries from different sources within 24 hours, while inquiries on boat or car sales may have longer time periods, such as two weeks.

If the duplicate leads are not from different sources, but are for different products or services from the same source, the system may also identify additional value in the duplicate leads. As an example, an individual may have commercial and private property requiring insurance. On the same webpage, the individual may submit a form for insurance for one property and then a few minutes later submit a form for insurance on the other. The system may recognize the duplicate information based on the entered data or monitoring browsing activity on the webpage. Even though the lead is generated from the same source, the system may flag the lead as high-value based on the cross-sell opportunities. If a lead is not recognized as high value in block 1613, the duplication module determines if the duplicates are for different products or services in block 1615. If the duplicate leads are for different products, the lead is flagged as a cross-sell opportunity in block 1616.

Moving on to block 1617, the system determines if the time period between contacts by duplicate leads is above a threshold. If there is sufficient time between contacts, a lead may be treated as a "multiple inquiry" lead. A multiple inquiry lead is a lead that has expressed prolonged interest in a product or service. For example, a potential student may inquiry about admission to a university once, but determines it is not the right time to attend college. The same student may inquiry again in two years later. Based on the duplication criteria, the lead may be recognized as a duplicate, and then flagged as a multiple inquiry lead by the system in block 1618. Multiple inquiries over a long time span indicate that the lead's interest is serious and the return may indicate the lead is ready to make a decision at this point. In block 1618 the system may only flag as "multiple inquiry" leads those that have occurred over a long time period. For example, the system may require at least 6 months or a year between inquiries. The required delay may prevent prioritization of leads that are checking back on a product or service, but are not showing newly expressed interest.

Moving to block 1620, if a lead is flagged as either high value or multiple inquiry, the system may increase the lead score for use in distribution and prioritization of the lead. The process in FIG. 16 illustrates flagging leads as one of high value or multiple inquiry, but in some embodiments, the system may be configured such that it can flag an inquiry as both. For example, an individual may have inquired about a product or service two years ago and then inquire about the same product or service multiple times from different sources today. The lead may then be flagged as both high value and multiple inquiry.

Moving on to block 1622, the system adds connection data to the duplicate leads. The connection data may include an identification number or other reference added to each duplicate lead to indicate the duplicate relationship. In some embodiments, all of a set of duplicate leads may receive the same identification or reference numbers. In other embodiments, the duplicate leads have reference or identification numbers and adding connection data to a lead comprises adding reference to the other duplicate leads.

Moving on to block 1624, the distribution module distributes the leads based on a set of distribution rules 1626. Some example rules may include a maximum number of leads that may be assigned to an agent, sending duplicate leads to the same agent, sending high value or multiple inquiry leads only to a subset of agents, or other rules intended to increase the response from the leads. In some embodiments, the system may be configured to distribute leads using techniques similar to those described in U.S. patent application Ser. No. 14/091,876, entitled LEAD DISTRIBUTION, filed on Nov. 27, 2013.

Moving on to block 1628, a computing system associated with an agent receives the lead from the distribution system. In block 1630, the system prioritizes the lead within the agent's leads based at least in part on the lead's score. The lead may also be prioritized higher or lower based on flags such as "high value" or "multiple inquiry," or because the lead is a duplicate. Moving on to block 1632, the agent receives information regarding the lead and the previous contact information. Lead information may include contact information as well as the lead's origin. The agent may also receive connection data such as duplicate leads that have been connected with the lead in block 1622. In addition to the connection data, when accessing a lead, the agent may be presented with the duplicate leads and any lead information associated with the previous contact. For example, if an individual is a multiple inquiry lead for a loan, but the real estate or car associated with the lead has changed, that information may be presented to the agent to user when accessing lead information.

Computing System

Figure 17:
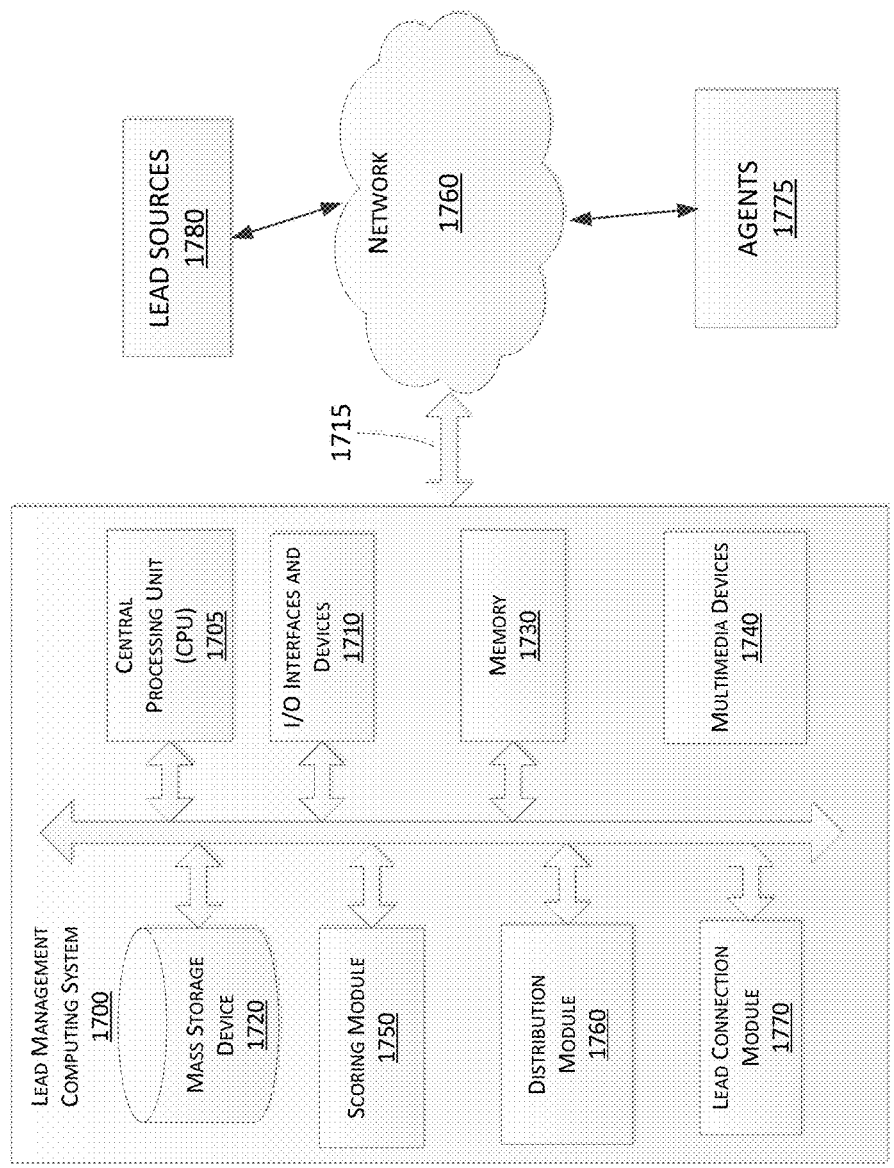
FIG. 17 illustrates a sample block diagram representing hardware and/or software components of an example embodiment of a lead connection system.

FIG. 17 is a block diagram showing one embodiment of an interest rate estimation platform. The illustrated interest rate estimation platform comprises a lead management computing system 1700 (or simply "computing system 1700"), that utilizes a communication link 1715, to electronically communicate over a network 1760 with one or more lead sources 1780 and a set of sales agents 1775. The computing system 1700 includes a central processing unit (CPU) 1705, input/output (I/O) devices and interfaces 1710, a mass storage device 1720, a memory 1730, multimedia devices 1740, a scoring module 1750, distribution module 1760, and a lead connection module 1770.

In some embodiments, one or more of the databases may be implemented using a relational database, such as Sybase, Oracle, CodeBase, and Microsoft® SQL Server, as well as other types of databases such as, for example, a flat file database, an entity-relationship database, and object-oriented database, and/or a record-based database. The lead connection module 1770 may communicate over network 1760 to receive lead from lead source 1780. Based on the received leads the lead connection module may determine if one or more of the leads should be connected and may store the leads and/or connection data in memory 1730 or mass storage device 1720. Based on data associated with leads and lead connection data, scoring module 1750 may generate scores for each of the leads. The distribution module 1760 may distribute leads to agents 1775 based on the lead scores and the lead connection information.

The scoring module 1750, distribution module 1760, and lead connection module 1770 may be stored in the mass storage device 1720 as executable software codes that are executed by the CPU 1705. The scoring module 1750, distribution module 1760, and lead connection module 1770 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 17, the computing system 1700 is configured to execute the scoring module 1750, distribution module 1760, and lead connection module 1770 in order to manage and distribute, for example, sales leads to one or more agents 1775. The scoring module 1750, distribution module 1760, and lead connection module 1770 may also provide one or more of the features discussed above, including deduplication of leads, scoring leads, distributing leads, generating connection and referral networks for leads, as well as providing the connection and lead data to agents 1775. In some embodiments, the computing system 1700 illustrated in FIG. 17 may include fewer or additional components.

The lead system 1700 may include one or more computing devices, for example, a personal computer that is IBM, Macintosh, or Linux/Unix compatible or a server or workstation. In one embodiment, the lead system 1700 comprises a server, for example. In one embodiment, the exemplary lead system 1700 includes one or more CPU 1705, which may each include a conventional or proprietary microprocessor. The computing system 1700 further includes one or more memory 1730, such as random access memory ("RAM") for temporary storage of information, one or more read only memory ("ROM") for permanent storage of information, and one or more mass storage device 1720, such as a hard drive, diskette, solid state drive, or optical media storage device. Typically, the modules of the computing system 1700 are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 1700 may be combined into fewer components and modules or further separated into additional components and modules.

The computing system 1700 is generally controlled and coordinated by operating system software, such as Windows XP, Windows Vista, Windows 7, Windows 8, Windows Server, Unix, Linux, SunOS, Solaris, iOS, Blackberry OS, Android, or other compatible operating systems. In Macintosh systems, the operating system may be any available operating system, such as MAC OS X. In other embodiments, the computing system 1700 may be controlled by a proprietary operating system. Conventional operating systems control and schedule computer processes for execution, perform memory management, provide file system, networking, I/O services, and provide a user interface, such as a graphical user interface ("GUI"), among other things. To implement the computing system 1700 and/or one or more of its components, various software including Perl, Syncsort DMExpress, MySQL, InfoBright, Veritca, DB2 Connect, Connect Direct, MapR M5 Hadoop, and/or Tableau can be utilized.

The exemplary computing system 1700 may include one or more commonly available I/O devices and interfaces 1710, such as a keyboard, mouse, touchpad, and printer. In one embodiment, the I/O devices and interfaces 1710 include one or more display devices, such as a monitor, that allows the visual presentation of data to a user. More particularly, a display device provides for the presentation of GUIs, application software data, and multimedia presentations, for example. The computing system 1700 may also include one or more multimedia devices 1740, such as speakers, video cards, graphics accelerators, and microphones, for example.

In the embodiment of FIG. 17, the I/O devices and interfaces 1710 provide a communication interface to various external devices. In the embodiment of FIG. 17, the computing system 1700 is electronically coupled to a network 1760, which comprises one or more of a LAN, WAN, and/or the Internet, for example, via a wired, wireless, or combination of wired and wireless, communication link 1715. The network 1760 communicates with various computing devices and/or other electronic devices via wired or wireless communication links.

In general, the word "module," as used herein, refers to logic embodied in hardware or firmware, or to a collection of software instructions, possibly having entry and exit points, written in a programming language, such as, for example, Java, Lua, C and/or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 1700, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

It is also recognized that the term "remote" may include data, objects, devices, components, and/or modules not stored locally, that is not accessible via the local bus. Thus, remote data may include data on a device which is physically stored in the same room and connected to the user's device via a network. In other situations, a remote device may also be located in a separate geographic area, such as, for example, in a different location, country, and so forth.

Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state.

The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more computers. For example, the methods described herein may be performed by the lead system 100 and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing uappears in text, the systems and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the systems and methods with which that terminology is associated.

What is claimed is:

1. A profile management system comprising: one or more hardware computer processors; one or more storage devices configured to store software instructions configured for execution by the one or more hardware computer processor in order to cause the computer system to:
   determine one or more attributes of a first profile;
   generate a profile score for the first profile based at least in part on the one or more attributes of the first profile, wherein the profile score is generated based on a scoring model configured to correlate the attributes of a profile with a likelihood that contacting the profile will result in a positive outcome;
   identify a connection between the first profile and a second profile based at least in part on the attributes of the first profile;
   generate connection data indicating a relationship between the first profile and the second profile;
   associate the connection data with the first profile and the second profile; update the profile score for the first profile based on the connection data; assign the first profile to an agent based on at least one of: the one or more attributes of the first profile, the profile score for the first profile, and the connection data associated with the first profile;
   distribute the first profile, the connection data associated with the first profile, and the second profile to the assigned agent; and
   prioritize the first profile among a set of profiles assigned to the agent based on the connection data associated with the first profile.

2. The lead management system of claim 1, wherein the first profile is assigned to the agent based on a determination that the second profile is assigned to the agent.

3. The profile management system of claim 1, wherein the identified connection between the first profile and the second profile comprises an indication that the first profile and second profile are duplicates associated with a common entity.

4. The profile management system of claim 3, wherein the first profile is identified as a high value profile based on a determination that the common entity associated with the first profile and the second profile initiated contact attempts within a threshold period of time.

5. The profile management system of claim 4, wherein the first profile is prioritized ahead of other profiles in the set of profiles assigned to the agent based on a determination that the profile is a high value profile.

6. The profile management system of claim 3, wherein the first profile is identified as a multiple contact profile based on a determination that the first profile and the second profile are duplicates associated with the common entity and the first profile initiated a first contact attempt at least a threshold amount of time after the second profile initiated a second contact attempt.

7. The profile management system of claim 6, wherein the first profile is prioritized ahead of other profiles in the set of profiles assigned to the agent based on a determination that the profile is a multiple contact profile.

8. The profile management system of claim 1, wherein the identified connection comprises an indication that a first entity associated with the first profile was referred from a second entity associated with the second profile.

9. The profile management system of claim 1, wherein the profile score is increased based on the determination that the first profile is a referral from the second profile.

10. The profile management system of claim 1, wherein the identified connection between the first profile and the second profile comprises an indication that the first profile and second profile are associated with the same company.

* * * * *